(12) United States Patent
Gorman

(10) Patent No.: US 8,910,377 B2
(45) Date of Patent: *Dec. 16, 2014

(54) METHOD OF MANUFACTURING A WIRING MODULE

(75) Inventor: Michael P. Gorman, Laguna Niguel, CA (US)

(73) Assignee: ProtectConnect, Newport Beach, CA (US)

( * ) Notice: Subject to any disclaimer, the term of this patent is extended or adjusted under 35 U.S.C. 154(b) by 390 days.

This patent is subject to a terminal disclaimer.

(21) Appl. No.: 13/251,978

(22) Filed: Oct. 3, 2011

(65) Prior Publication Data

US 2012/0021623 A1 Jan. 26, 2012

Related U.S. Application Data

(63) Continuation of application No. 12/780,687, filed on May 14, 2010, now Pat. No. 8,028,408, which is a (Continued)

(51) Int. Cl.
*H01R 43/00* (2006.01)
*H01R 29/00* (2006.01)

(Continued)

(52) U.S. Cl.
CPC .......... *H01H 11/0006* (2013.01); *H01R 29/00* (2013.01); *H02G 3/086* (2013.01);

(Continued)

(58) Field of Classification Search
USPC ..................... 29/857, 858, 861, 863; 439/417
See application file for complete search history.

(56) References Cited

U.S. PATENT DOCUMENTS

| 723,866 | A | 3/1903 | Hart |
| 776,855 | A | 12/1904 | La Har |

(Continued)

FOREIGN PATENT DOCUMENTS

| CN | 2381040 Y | 5/2000 |
| GB | 1 420 748 | 1/1976 |
| GB | 2 341 733 | 3/2000 |

OTHER PUBLICATIONS

U.S. Appl. No. 10/685,294, filed Oct. 14, 2003, Gorman, Michael P.

(Continued)

*Primary Examiner* — Carl Arbes
(74) *Attorney, Agent, or Firm* — Knobbe, Martens, Olson & Bear, LLP

(57) ABSTRACT

A wiring module that can be installed in an electrical junction box and can receive a removable electrical outlet module, a removable electrical switch module, or other types of electrical functional modules. The wiring module and the removable electrical outlet and switch modules may include connectors having a mechanical portion and an electrical portion. The electrical connector portions may be configured so as not to be exposed to user contact when the mechanical connector portions are at least partially engaged.

9 Claims, 39 Drawing Sheets

Related U.S. Application Data continuation of application No. 12/106,984, filed on Apr. 21, 2008, now Pat. No. 7,762,838, which is a continuation of application No. 11/493,366, filed on Jul. 25, 2006, now Pat. No. 7,361,051, which is a continuation of application No. 11/110,659, filed on Apr. 20, 2005, now Pat. No. 7,081,010, which is a continuation of application No. 10/443,444, filed on May 22, 2003, now Pat. No. 6,884,111.

(60) Provisional application No. 60/383,269, filed on May 23, 2002, provisional application No. 60/441,852, filed on Jan. 21, 2003.

(51) Int. Cl.
| | |
|---|---|
| *H01H 11/00* | (2006.01) |
| *H01R 13/46* | (2006.01) |
| *H01R 25/00* | (2006.01) |
| *H01R 13/05* | (2006.01) |
| *H01R 13/512* | (2006.01) |
| *H05B 39/08* | (2006.01) |
| *H01R 13/652* | (2006.01) |
| *H01R 4/44* | (2006.01) |
| *H01R 13/70* | (2006.01) |
| *H01R 13/44* | (2006.01) |
| *H01R 13/506* | (2006.01) |
| *H01R 13/66* | (2006.01) |
| *H01R 13/447* | (2006.01) |
| *H01R 24/78* | (2011.01) |
| *H01R 31/06* | (2006.01) |
| *H02G 3/08* | (2006.01) |
| *H01H 9/08* | (2006.01) |
| *H01R 13/514* | (2006.01) |
| *H01R 4/48* | (2006.01) |
| *H01R 4/30* | (2006.01) |
| *H01R 9/24* | (2006.01) |
| *H01R 13/115* | (2006.01) |
| *H01R 24/22* | (2011.01) |
| *H01R 13/52* | (2006.01) |
| *H01R 13/639* | (2006.01) |
| *H01H 15/00* | (2006.01) |
| *H01H 15/10* | (2006.01) |
| *H01R 13/424* | (2006.01) |
| *H01R 4/66* | (2006.01) |
| *H01R 103/00* | (2006.01) |

(52) U.S. Cl.
CPC .............. *H01R 13/465* (2013.01); *H01H 9/08* (2013.01); *H01R 13/514* (2013.01); *H01R 25/006* (2013.01); *H01R 4/4818* (2013.01); *H01R 13/055* (2013.01); *H01R 4/30* (2013.01); *H01R 9/24* (2013.01); *H01R 13/115* (2013.01); *H01R 13/512* (2013.01); *H05B 39/08* (2013.01); *H01R 24/22* (2013.01); *H01R 13/5213* (2013.01); *H01R 13/6395* (2013.01); *H01H 15/00* (2013.01); *H01R 13/652* (2013.01); *H01H 15/10* (2013.01); *H01R 4/44* (2013.01); *H01R 13/424* (2013.01); *H01R 4/66* (2013.01); *H01R 9/2433* (2013.01); *H01R 13/701* (2013.01); *H01R 13/44* (2013.01); *H01R 13/506* (2013.01); *H01R 2103/00* (2013.01); *H01R 13/6658* (2013.01); *H01R 13/447* (2013.01); *H01R 24/78* (2013.01); *H01R 31/06* (2013.01)
USPC .................. 29/857; 29/858; 29/861; 29/863; 439/417

(56) References Cited

U.S. PATENT DOCUMENTS

| | | |
|---|---|---|
| 949,123 A | 2/1910 | Klein |
| 1,171,914 A | 2/1916 | Wright |
| 1,328,224 A | 1/1920 | Benjamin |
| 1,758,126 A | 5/1930 | Peterson |
| 1,938,309 A | 12/1930 | Williams |
| 1,923,893 A | 8/1933 | Smith |
| 1,935,565 A | 11/1933 | Goetzelman |
| 1,956,196 A | 4/1934 | Korab |
| 2,140,376 A | 12/1938 | Anderson |
| 2,163,201 A | 6/1939 | Kalencik |
| 2,189,251 A | 2/1940 | Potter |
| 2,397,688 A | 4/1946 | Osinski |
| 2,433,917 A | 1/1948 | McCartney |
| 2,447,597 A | 8/1948 | Reed |
| 2,477,803 A | 8/1949 | Huber |
| 2,524,701 A | 10/1950 | Grill |
| 2,908,743 A | 10/1959 | Premoshis |
| 2,969,518 A | 1/1961 | Slater |
| 3,087,984 A | 4/1963 | Myer |
| 3,156,761 A | 11/1964 | Schinske |
| 3,189,077 A | 6/1965 | Willis, Jr. et al. |
| 3,214,726 A | 10/1965 | Cardenas et al. |
| 3,317,881 A | 5/1967 | Setecka |
| 3,467,941 A | 9/1969 | Martin |
| 3,489,985 A | 1/1970 | Martin |
| 3,510,822 A | 5/1970 | Patterson |
| 3,588,786 A | 6/1971 | Alfiero |
| 3,609,647 A | 9/1971 | Castellano |
| 3,654,663 A | 4/1972 | Algotsson |
| 3,710,287 A | 1/1973 | Eckert |
| 3,716,651 A | 2/1973 | Werner |
| 3,732,524 A | 5/1973 | Reed et al. |
| 3,868,161 A | 2/1975 | Frantz |
| 3,879,101 A | 4/1975 | McKissic |
| 3,930,704 A | 1/1976 | Dekanic |
| 3,972,498 A | 8/1976 | Paskert |
| 3,989,338 A | 11/1976 | Gosser |
| 4,103,125 A | 7/1978 | Marrero |
| 4,105,884 A | 8/1978 | Damsky |
| 4,117,258 A | 9/1978 | Shanker |
| 4,148,536 A | 4/1979 | Petropoulsos et al. |
| 4,165,443 A | 8/1979 | Figart et al. |
| 4,166,934 A | 9/1979 | Marrero |
| 4,179,175 A | 12/1979 | Farnworth et al. |
| 4,196,521 A | 4/1980 | Hutchinson et al. |
| 4,230,386 A | 10/1980 | Farnworth et al. |
| 4,263,472 A | 4/1981 | Maheu |
| 4,295,018 A | 10/1981 | Borrelli |
| 4,343,411 A | 8/1982 | Chesnut et al. |
| 4,372,634 A | 2/1983 | Ritchie et al. |
| 4,403,824 A | 9/1983 | Scott |
| 4,427,864 A | 1/1984 | Oster |
| 4,445,739 A | 5/1984 | Wooten |
| 4,485,282 A | 11/1984 | Lee |
| 4,493,517 A | 1/1985 | Hillary |
| 4,585,902 A | 4/1986 | Munroe |
| 4,599,485 A | 7/1986 | Smolik |
| 4,600,258 A | 7/1986 | Hu |
| 4,605,270 A | 8/1986 | Aslizadeh |
| 4,607,906 A | 8/1986 | Munroe |
| 4,612,412 A | 9/1986 | Johnston |
| 4,617,613 A | 10/1986 | Rice |
| 4,626,052 A | 12/1986 | Rumble |
| 4,627,675 A | 12/1986 | Taylor et al. |
| 4,634,015 A | 1/1987 | Taylor |
| 4,640,564 A | 2/1987 | Hill |
| 4,645,089 A | 2/1987 | Horsley |
| 4,664,457 A | 5/1987 | Suchy |
| 4,679,123 A | 7/1987 | Young |
| 4,722,693 A | 2/1988 | Rose |
| 4,747,506 A | 5/1988 | Stuchlik, III |
| 4,750,890 A | 6/1988 | Dube et al. |
| 4,780,088 A | 10/1988 | Means |
| 4,784,614 A | 11/1988 | Sadigh-Behzadi |
| 4,798,916 A | 1/1989 | Engel et al. |

(56) References Cited

U.S. PATENT DOCUMENTS

| | | |
|---|---|---|
| 4,808,127 A | 2/1989 | Swanic |
| 4,842,551 A | 6/1989 | Heimann |
| 4,871,893 A | 10/1989 | Slovak et al. |
| 4,873,469 A | 10/1989 | Young et al. |
| 4,880,950 A | 11/1989 | Carson et al. |
| 4,907,711 A | 3/1990 | Stuchlik, III |
| 4,914,265 A | 4/1990 | Mongeau |
| D308,045 S | 5/1990 | Counts et al. |
| 4,952,164 A | 8/1990 | Weber et al. |
| D310,814 S | 9/1990 | Rosenbaum |
| 4,967,990 A | 11/1990 | Rinderer |
| 4,972,045 A | 11/1990 | Primeau |
| 4,988,840 A | 1/1991 | Carson et al. |
| 4,998,343 A | 3/1991 | Costello |
| 5,002,501 A | 3/1991 | Tucker |
| 5,003,128 A | 3/1991 | Grondin |
| D316,250 S | 4/1991 | Mongeau |
| 5,004,432 A | 4/1991 | Tucker |
| 5,012,043 A | 4/1991 | Seymour |
| 5,030,119 A | 7/1991 | Lowe |
| 5,042,673 A | 8/1991 | McShane |
| 5,092,787 A | 3/1992 | Wise et al. |
| 5,098,046 A | 3/1992 | Webb |
| 5,178,555 A | 1/1993 | Kilpatrick et al. |
| 5,209,444 A | 5/1993 | Rinderer |
| 5,245,507 A | 9/1993 | Ericksen |
| D341,125 S | 11/1993 | Miller |
| 5,285,014 A | 2/1994 | Gilchrist |
| 5,288,041 A | 2/1994 | Webb |
| 5,289,934 A | 3/1994 | Smith et al. |
| 5,293,097 A | 3/1994 | Elwell |
| 5,297,973 A | 3/1994 | Gorman |
| 5,330,137 A | 7/1994 | Olivia |
| 5,342,993 A | 8/1994 | Siems |
| 5,386,959 A | 2/1995 | Laughlin et al. |
| 5,397,929 A | 3/1995 | Hogarth et al. |
| 5,399,806 A | 3/1995 | Olson |
| 5,415,564 A | 5/1995 | Winter et al. |
| 5,448,011 A | 9/1995 | Laughlin |
| 5,466,164 A | 11/1995 | Miyazaki et al. |
| 5,486,121 A | 1/1996 | Miller |
| 5,488,121 A | 1/1996 | O'Lenick, Jr. |
| 5,500,487 A | 3/1996 | Leon |
| 5,503,565 A | 4/1996 | McCoy |
| 5,516,068 A | 5/1996 | Rice |
| 5,525,755 A | 6/1996 | Christensen |
| 5,533,917 A | 7/1996 | Schmitz |
| 5,551,884 A | 9/1996 | Burkhart, Sr. |
| 5,562,222 A | 10/1996 | Jordan |
| 5,562,952 A | 10/1996 | Nakahigashi et al. |
| 5,599,199 A | 2/1997 | Wright |
| 5,608,196 A | 3/1997 | Hall et al. |
| 5,611,701 A | 3/1997 | Hahn |
| 5,613,874 A | 3/1997 | Orlando et al. |
| 5,625,531 A | 4/1997 | Padilla et al. |
| 5,639,991 A | 6/1997 | Schuette |
| D380,452 S | 7/1997 | Mix et al. |
| D384,643 S | 10/1997 | Nierlich et al. |
| 5,730,617 A | 3/1998 | Araki et al. |
| 5,741,153 A | 4/1998 | Schwer |
| 5,773,757 A | 6/1998 | Kenney et al. |
| 5,775,935 A | 7/1998 | Barna |
| 5,785,551 A | 7/1998 | Libby |
| 5,786,551 A | 7/1998 | Thangavelu |
| 5,807,139 A | 9/1998 | Volansky et al. |
| D399,495 S | 10/1998 | Bachschmid |
| 5,885,088 A | 3/1999 | Brennan et al. |
| 5,902,960 A | 5/1999 | Smith |
| 5,906,497 A | 5/1999 | Pham et al. |
| 5,924,888 A | 7/1999 | Larkin |
| 5,925,850 A | 7/1999 | Park |
| 5,931,325 A | 8/1999 | Filipov |
| D415,472 S | 10/1999 | Kelso et al. |
| 5,967,354 A | 10/1999 | Whitehead et al. |
| 5,980,279 A | 11/1999 | Muller |
| 5,998,747 A | 12/1999 | Kelso et al. |
| 6,029,581 A | 2/2000 | Daoud |
| 6,036,516 A | 3/2000 | Byrne |
| D430,114 S | 8/2000 | Bachschmid et al. |
| 6,098,939 A | 8/2000 | He |
| 6,201,187 B1 | 3/2001 | Burbine |
| 6,209,836 B1 | 4/2001 | Swanson |
| 6,231,358 B1 | 5/2001 | Kerr, Jr. et al. |
| 6,259,351 B1 | 7/2001 | Radosavljevic et al. |
| 6,309,248 B1 | 10/2001 | King |
| 6,311,229 B1 | 10/2001 | Burchard et al. |
| 6,341,981 B1 | 1/2002 | Gorman |
| 6,371,790 B1 | 4/2002 | Huang |
| 6,392,140 B1 | 5/2002 | Yee et al. |
| D461,775 S | 8/2002 | Littrell et al. |
| 6,441,304 B1 | 8/2002 | Currier et al. |
| 6,461,189 B1 | 10/2002 | Koh |
| 6,465,735 B2 | 10/2002 | May |
| 6,484,979 B1 | 11/2002 | Medlin, Jr. |
| 6,485,336 B1 | 11/2002 | Zebermann et al. |
| 6,492,591 B1 | 12/2002 | Metcalf |
| 6,494,728 B1 | 12/2002 | Gorman |
| 6,530,806 B2 | 3/2003 | Nelson |
| D472,883 S | 4/2003 | Harvey |
| 6,590,155 B2 | 7/2003 | Vrame et al. |
| 6,617,511 B2 | 9/2003 | Schultz |
| 6,623,296 B2 | 9/2003 | Okamoto |
| 6,642,450 B1 | 11/2003 | Hsiao |
| 6,648,678 B1 | 11/2003 | Kanekko |
| 6,653,566 B2 | 11/2003 | Petak et al. |
| 6,686,540 B2 | 2/2004 | Compagnone, Jr. |
| 6,700,062 B1 | 3/2004 | Allen, Jr. |
| 6,718,674 B2 | 4/2004 | Caveney et al. |
| 6,730,845 B2 | 5/2004 | Criniti et al. |
| 6,747,206 B1 | 6/2004 | Law |
| 6,765,146 B1 | 7/2004 | Gerardo |
| 6,767,245 B2 | 7/2004 | King |
| 6,770,814 B2 | 8/2004 | Shotey et al. |
| 6,774,307 B2 | 8/2004 | Kruse et al. |
| 6,803,521 B2 | 10/2004 | Vrame |
| 6,805,567 B2 | 10/2004 | Chapman et al. |
| 6,817,873 B1 | 11/2004 | Gorman |
| 6,820,760 B2 | 11/2004 | Wegner et al. |
| 6,830,477 B2 | 12/2004 | Vander Vorste et al. |
| 6,840,785 B2 | 1/2005 | Drane |
| 6,843,680 B2 | 1/2005 | Gorman |
| 6,850,159 B1 | 2/2005 | Mudge |
| 6,863,561 B2 | 3/2005 | Gorman |
| 6,867,370 B2 | 3/2005 | Compagnone, Jr. |
| 6,870,099 B1 | 3/2005 | Schultz et al. |
| 6,875,922 B1 | 4/2005 | Petak et al. |
| 6,884,111 B2 | 4/2005 | Gorman |
| 6,894,221 B2 | 5/2005 | Gorman |
| 6,906,260 B2 | 6/2005 | Grendahl |
| 6,908,334 B2 | 6/2005 | Huang |
| 6,923,663 B2 | 8/2005 | Oddsen et al. |
| 6,925,850 B2 | 8/2005 | Comer et al. |
| 6,956,169 B1 | 10/2005 | Shotey et al. |
| 6,967,284 B1 | 11/2005 | Gretz |
| 6,979,212 B1 | 12/2005 | Gorman |
| 6,986,674 B1 | 1/2006 | Gorman |
| 6,986,676 B1 | 1/2006 | Tronolone et al. |
| 7,052,313 B2 | 5/2006 | Gorman |
| 7,060,897 B2 | 6/2006 | Gorman |
| 7,071,414 B2 | 7/2006 | Kim |
| 7,081,009 B2 | 7/2006 | Gorman |
| 7,081,010 B2 | 7/2006 | Gorman |
| 7,083,466 B1 | 8/2006 | Hwang |
| 7,104,836 B1 | 9/2006 | Gorman |
| 7,265,291 B1 | 9/2007 | Gorman |
| 7,273,392 B2 | 9/2007 | Fields |
| 7,312,396 B1 | 12/2007 | Gorman |
| 7,321,120 B1 | 1/2008 | Gorman et al. |
| 7,323,638 B1 | 1/2008 | Radosavljevic |
| 7,332,683 B2 | 2/2008 | Gorman |
| 7,357,652 B1 | 4/2008 | Arenas et al. |
| 7,361,051 B2 | 4/2008 | Gorman |
| 7,367,121 B1 | 5/2008 | Gorman |
| 7,390,965 B2 | 6/2008 | Hartwig |

(56) References Cited

U.S. PATENT DOCUMENTS

| | | |
|---|---|---|
| 7,410,072 B2 | 8/2008 | Wegner et al. |
| 7,442,874 B2 | 10/2008 | Compagnone, Jr. |
| 7,468,486 B2 | 12/2008 | Yan |
| 7,495,170 B2 | 2/2009 | Dinh et al. |
| 7,544,941 B2 | 6/2009 | Gorman et al. |
| 7,572,977 B2 | 8/2009 | Gorman |
| 7,718,893 B2 | 5/2010 | Purves et al. |
| 7,762,838 B2 | 7/2010 | Gorman |
| 8,028,408 B2 * | 10/2011 | Gorman ............ 29/861 |
| 8,105,107 B2 | 1/2012 | Gorman |
| 8,388,371 B2 | 3/2013 | Gorman |
| 8,678,856 B2 | 3/2014 | Gorman |
| 2002/0055301 A1 | 5/2002 | Gorman |
| 2002/0185296 A1 | 12/2002 | Schultz et al. |
| 2003/0178218 A1 | 9/2003 | Shotey et al. |
| 2003/0189043 A1 | 10/2003 | Wegner et al. |
| 2003/0205654 A1 | 11/2003 | Petak et al. |
| 2003/0213801 A1 | 11/2003 | Bradley et al. |
| 2004/0048507 A1 | 3/2004 | Hage |
| 2004/0129444 A1 | 7/2004 | Adams et al. |
| 2005/0001123 A1 | 1/2005 | Cheatham et al. |
| 2005/0067180 A1 | 3/2005 | Dinh |
| 2005/0067546 A1 | 3/2005 | Dinh |
| 2005/0176278 A1 | 8/2005 | Cheatham et al. |
| 2005/0224249 A2 | 10/2005 | Wegner et al. |
| 2005/0250378 A1 | 11/2005 | Gorman |
| 2006/0021780 A1 | 2/2006 | Hill |
| 2006/0065510 A1 | 3/2006 | Kiko et al. |
| 2007/0072486 A1 | 3/2007 | Gorman |
| 2007/0072487 A1 | 3/2007 | Gorman |
| 2008/0053698 A1 | 3/2008 | Purves et al. |
| 2010/0218969 A1 | 9/2010 | Purves et al. |
| 2012/0021623 A1 | 1/2012 | Gorman |

OTHER PUBLICATIONS

U.S. Appl. No. 10/923,393, filed Dec. 17, 2001, Gorman, Michael P.
U.S. Appl. No. 10/988,742, filed Nov. 15, 2004, Gorman, Michael P.
U.S. Appl. No. 11/287,883, filed Nov. 26, 2005, Gorman, Michael P.
U.S. Appl. No. 11/287,885, filed Nov. 26, 2005, Gorman, Michael P.
U.S. Appl. No. 11/452,130, filed Jun. 12, 2006, Gorman, Michael P.
U.S. Appl. No. 11/519,447, filed Sep. 12, 2006, Gorman, Michael P.
U.S. Appl. No. 12/115,419, filed May 5, 2008, Gorman, Michael P.
U.S. Appl. No. 14/219,337, filed Mar. 19, 2014, Gorman, Michael P.
Cooper Industries, Inc.; Crouse-Hinds Division, Power-Lock Locking Device—Product Specification, 1996, pp. B6. B55, Syracuse, NY.
U.S. Appl. No. 60/174,521, filed Jan. 5, 2000, Gorman, Michael P.
U.S. Appl. No. 60/176,123, filed Jan. 14, 2000, Gorman, Michael P.
U.S. Appl. No. 90/011,275, filed Oct. 8, 2010, Gorman, Michael P.
Leviton Manufacturing Co, Inc., Leviton D-200 Wiring Device Catalog, Revision B (Published by Leviton, 1981).
Leviton Manufacturing Co., Inc. Leviton product catalog D-503 (Published by Leviton, 2001).

* cited by examiner

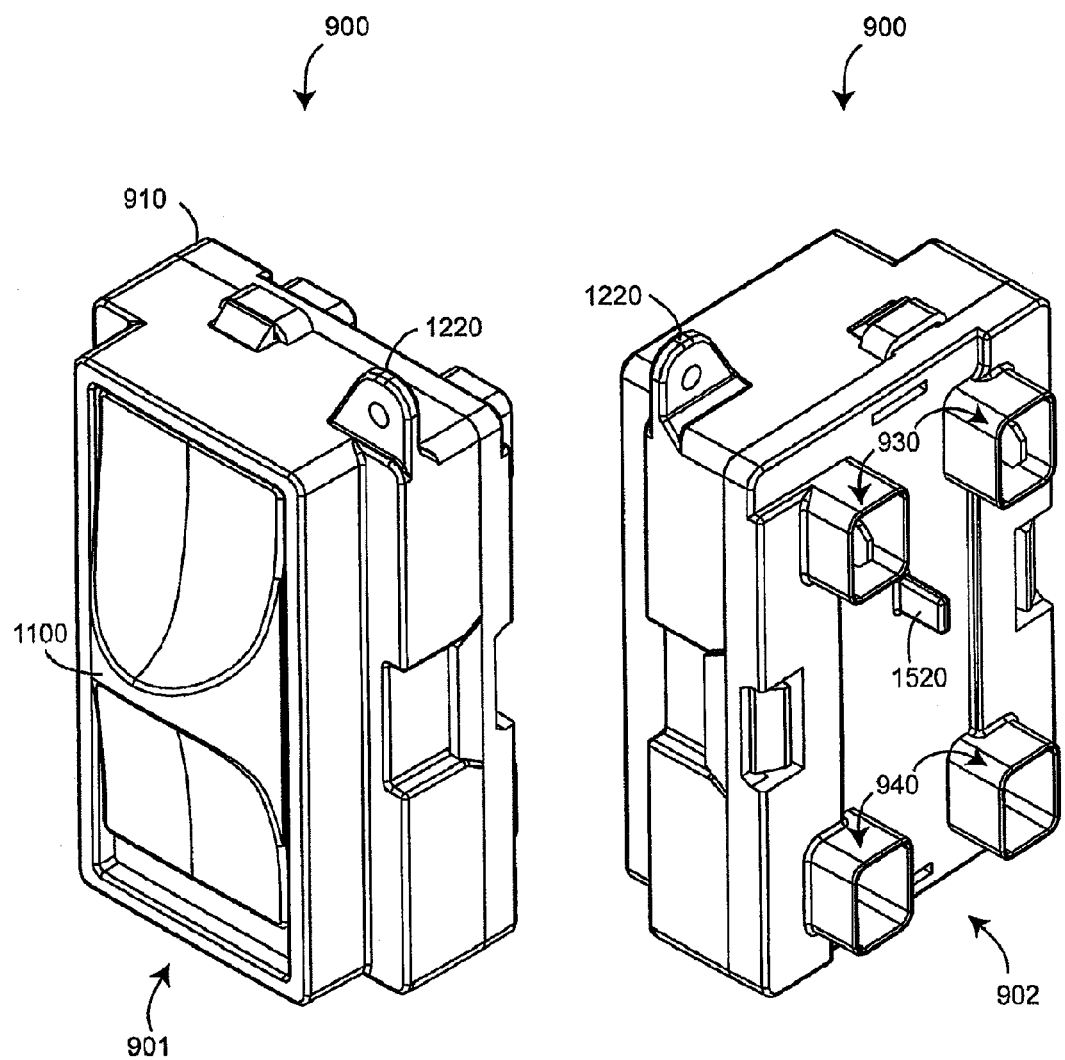

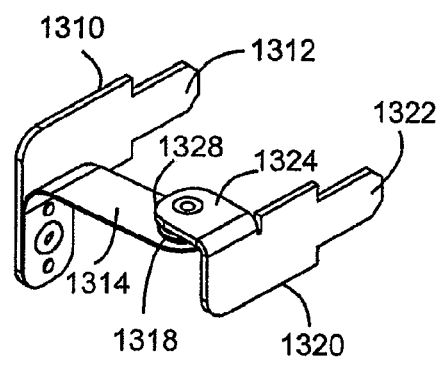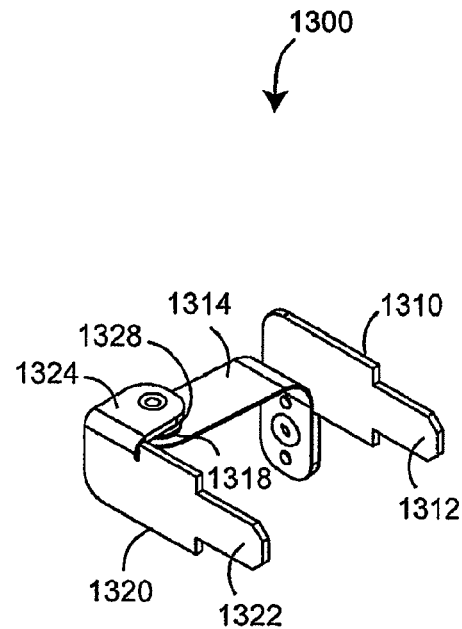
FIG. 13A
FIG. 13B

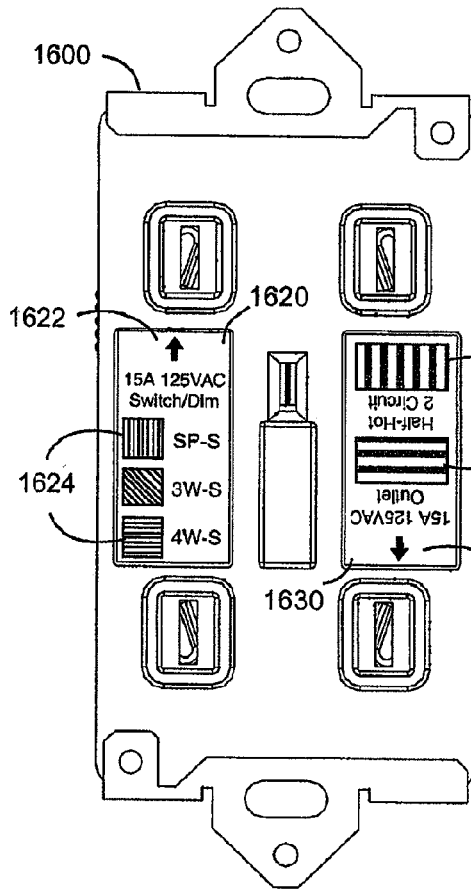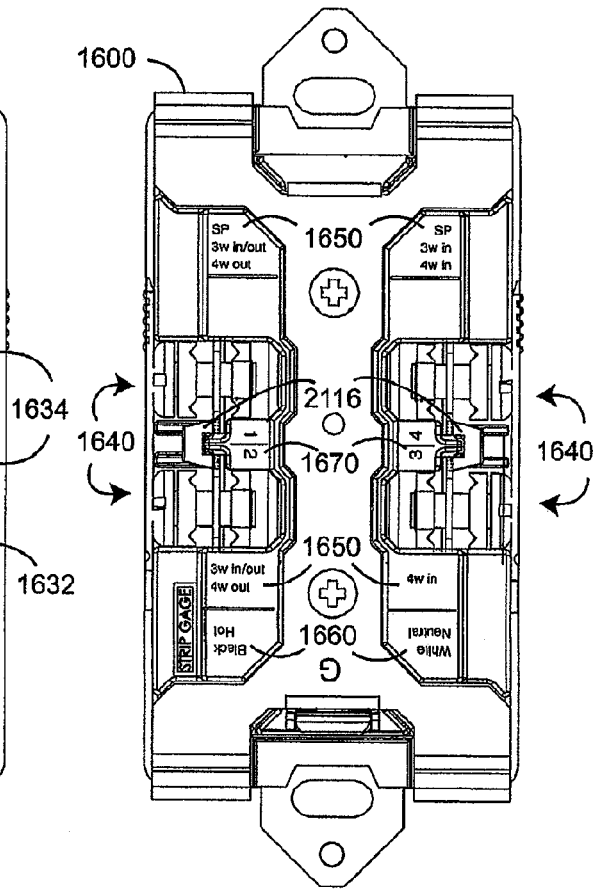
FIG. 16E  FIG. 16F
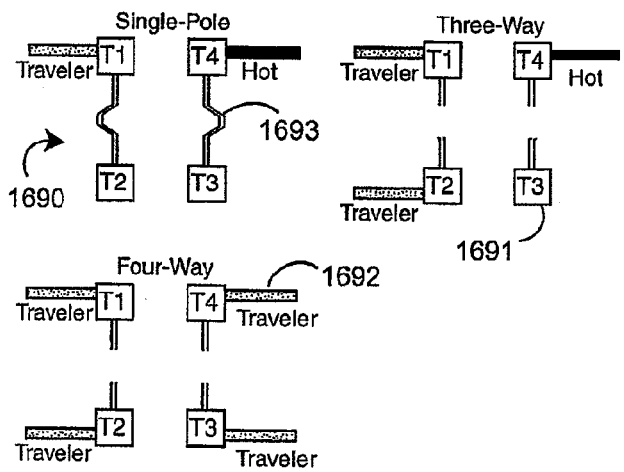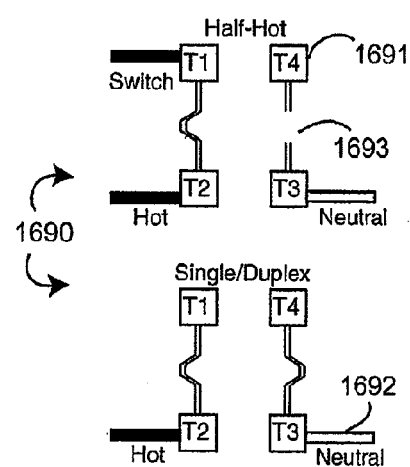
FIG. 16G  FIG. 16H

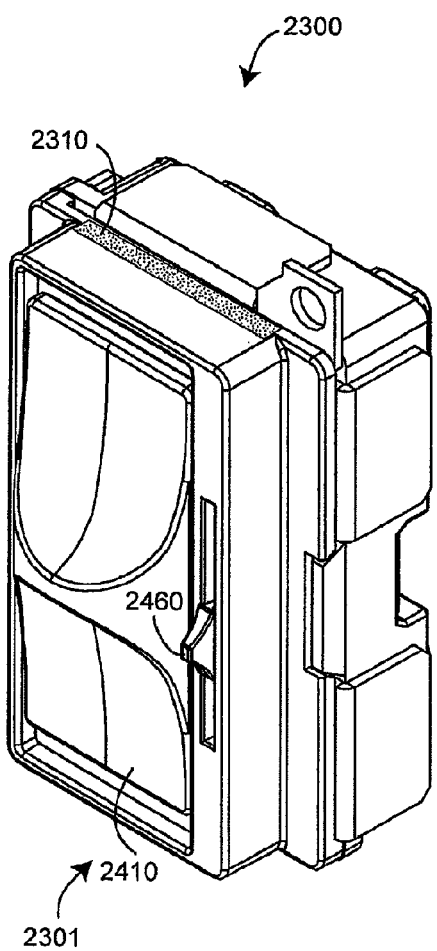
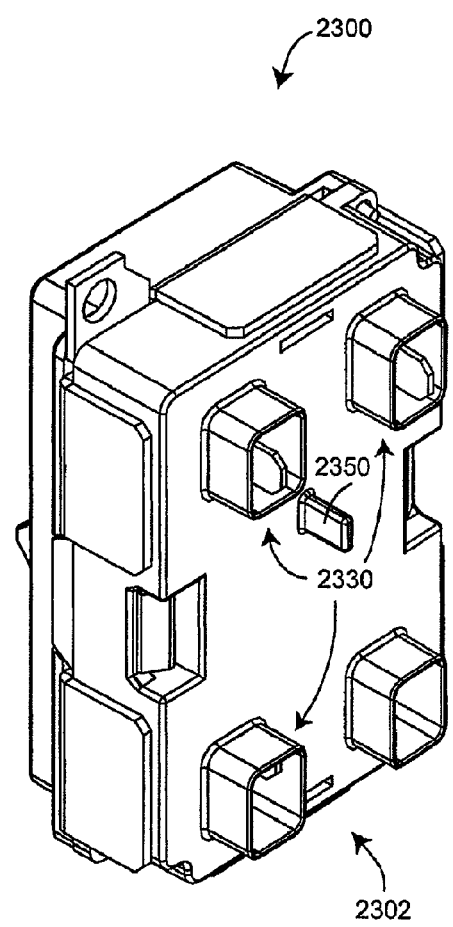
FIG. 23A
FIG. 23B

METHOD OF MANUFACTURING A WIRING MODULE

CROSS-REFERENCE TO RELATED APPLICATIONS

This application is a continuation of U.S. patent application Ser. No. 12/780,687, filed May 14, 2010, entitled SAFETY MODULE ELECTRICAL DISTRIBUTION SYSTEM, which is a continuation of U.S. patent application Ser. No. 12/106,984, entitled SAFETY MODULE ELECTRICAL DISTRIBUTION SYSTEM, filed Apr. 21, 2008, now U.S. Pat. No. 7,762,838, which is a continuation of U.S. patent application Ser. No. 11/493,366, entitled SAFETY MODULE ELECTRICAL DISTRIBUTION SYSTEM, filed Jul. 25, 2006, now U.S. Pat. No. 7,361,051, which is a continuation of U.S. patent application Ser. No. 11/110,659 entitled SAFETY MODULE ELECTRICAL DISTRIBUTION SYSTEM, filed Apr. 20, 2005, now U.S. Pat. No. 7,081,010 which is a continuation of U.S. patent application Ser. No. 10/443,444 entitled SAFETY MODULE ELECTRICAL DISTRIBUTION SYSTEM, filed May 22, 2003, now U.S. Pat. No. 6,884,111, which relates to and claims the benefit of prior U.S. Provisional Applications No. 60/383,269, filed May 23, 2002, entitled SAFETY PLUG-IN MODULE ELECTRICAL DISTRIBUTION SYSTEM, and No. 60/441,852, filed Jan. 21, 2003, entitled SAFETY MODULE ELECTRICAL DISTRIBUTION SYSTEM. All of the aforementioned prior applications are hereby incorporated by reference in their entirety herein.

BACKGROUND OF THE INVENTION

1. Field of the Invention

Standard AC electrical systems are comprised of an electrical box and an electrical device, such as an outlet or switch, installed within the box. During a roughing phase of construction, electrical boxes are mounted to wall studs at predetermined locations. After the boxes are installed, a journeyman electrician routes power cables through building framing to the appropriate boxes. The power cable is fed through openings in the rear or sides of the electrical boxes and folded back into the boxes, unterminated, so as to be out of the way until the next phase. During a makeup phase, wall panels are installed and painted, and the journeyman returns to the construction site to install the electrical devices into the boxes. After conductors are wired to an electrical device, it and the attached conductors are pushed into the electrical box and the device is attached to the top and bottom of the box with screws. During a trim phase, face plates are mounted over the open-end of the electrical boxes, completing the standard electrical wiring process.

2. Description of the Related Art

Standard AC electrical systems are problematic in construction and use, with respect to costs, safety and functionality. From an electrical contractor perspective, a journeyman electrician must make two separate trips to the job site, one for the rough phase and one for the makeup phase. Also, during the makeup phase, installation of the wall panels can damage the work completed during the rough phase. This occurs, for example, when a router contacts exposed cables as drywallers create a hole to accommodate electrical box openings. Another form of damage occurs when drywall compound or paint fouls the exposed cables, insulation and labeling.

From a general contractor's perspective, verification of the electrical contractor's work is not possible until after the makeup phase. Until then, the electrical cables are unterminated. After the makeup phase, however, miswiring typically requires cutouts in the installed wall panels and associated patches after corrections are completed. Further, the electrical system cannot be activated until after verification. Thus, during the rough and makeup phases, electricity for tools and lighting must be supplied by generators, which create hazards due to fumes, fuel, and noise and are an unreliable electrical source. In addition, until the trim phase is completed, unskilled personnel have access to the electrical cable. Tampering can compromise the integrity of the electrical wiring and also create a safety problem after power is activated.

From a homeowner's perspective, there are problems with repair of the standard electrical wiring. Replacement of a broken outlet or switch device first requires removal of a face plate. The screws that attach the module to the top and bottom of the electrical box must be removed next. The device is then removed from the box and the conductors are removed by loosing the screws on the outlet sides. The process is then reversed to attach the conductors to a new device and mount the new device into the electrical box.

The prior art electrical device replacement procedure described above exposes the homeowner to AC wiring upon removal of the face plate. This exposure creates a shock hazard. Further, a homeowner's reluctance to change out broken devices or to spend the money to hire an electrician also creates a shock and a fire hazard from continued use of cracked, broken or excessively worn outlets or switches. In addition, the integrity of the original wiring becomes questionable if a homeowner or other third party removes and replaces an electrical device. Miswiring by a third party can violate building codes and create shock and fire hazards, such as inadvertently switching the hot and neutral conductors, failing to attach ground wires, kinking or nicking conductors or improperly tightening connections.

A safety module electrical distribution system benefits the electrical contractor in several respects. A wiring module is installed internally to an electrical box and associated functional modules are removably installed into the wiring module without exposure to or access to electrical system wiring attached behind the panel. The journeyman's work can be completed at the rough phase, when installation of the wiring module is complete. Thus, there is no need for the journeyman to return to the job site during the makeup phase because any semi-skilled laborer can insert, for example, an appropriate outlet or switch module. Further, there is no wiring access after the rough phase, protecting wiring integrity. Also, there are no exposed conductors or parts inside the electrical box that can be inadvertently damaged during wall panel installation.

The safety module electrical distribution system also benefits the general contractor. Because wiring is completed during rough framing, verification and activation of the building electrical system can be performed at the rough phase. Miswiring can be corrected before wall panels are installed and painted, eliminating cut and patch repairs. Early electrical system activation eliminates the need to use generators. Lack of third party access to the journeyman's wiring preserves integrity after verification and eliminates shock exposure to other workers.

The safety module electrical distribution system also benefits the homeowner. Replacement of broken sockets and switches can be easily and safely accomplished. Safety is enhanced by reducing exposure to electrical wiring and encouraging replacement of defective outlets and switches. Further, maintenance costs are reduced by reducing the need to hire an electrician for repairs. Wiring integrity is insured by reducing the opportunity of unqualified third parties to access the electrical system.

SUMMARY OF THE INVENTION

Various embodiments of a safety module electrical distribution system are described herein. In some embodiments, a safety module electrical distribution system comprises a wiring module adapted to mount within an electrical box, the wiring module having a functional side and a wiring side. A terminal set is disposed at least partially within the wiring module and is adapted to terminate a power cable proximate the wiring side. A plurality of structured sockets are disposed on the functional side, the structured sockets incorporate a portion of the terminal set. A functional module having a front side and a back side is adapted to removably install in the wiring module proximate the functional side. A contact set is disposed at least partially within the functional module and is adapted to conduct electrical power to an electrical distribution function accessible from the front side. A plurality of shielded plugs are disposed on the back side. The shielded plugs incorporate a portion of the contact set. The structured sockets are configured to interlock with the shielded plugs so as to provide electrical communication between the terminal set and said contact set.

In one embodiment the structured sockets comprise raised guards and surrounding channels. The shielded plugs comprise contiguous walls disposed around the peripheries of, and extending about the length of, prong portions of the contact set, where the walls define open ends distal the back side. The walls mate with the channels and the raised guards insert into the open ends. A key extends from, and is positioned on, the back side so as to identify a type of the functional module. A block is positioned on the functional side so as to accept the key only when the functional module is properly oriented with respect to the wiring module. The wiring module is oriented within the electrical box according to the type. The key is an off-center positioned bar and the block is an off-center positioned ground socket. The bar is configured to insert into the ground socket.

In another embodiment, a plurality of color-coded wiring labels are disposed on the functional side, and a color-coded module label is disposed on the functional module. A marked one of the wiring labels indicate a particular wiring configuration of the wiring panel, and the color of the marked one corresponds to the color of the module label only if the functional module corresponds to the particular wiring configuration. In a further embodiment, the terminal set comprises a plurality of terminal blocks, where each of the terminal blocks are adapted to terminate up to four wires. In yet another embodiment, the terminal set comprises a plurality of fixed wires extending from the wiring side, where each of the fixed wires have a push-wire connector installed distal the wiring side. In an additional embodiment, an electrical box cover is adapted to clamp onto a mounting bracket portion of the wiring module so as to mount flush with the open face of the electrical box.

Another aspect of a safety module electrical distribution system comprises a wiring module adapted to mount within an electrical box. The wiring module has a functional side adapted to removably connect with a functional module and an opposite wiring side. A conductive terminal set is at least partially disposed proximate the wiring side and adapted to terminate a power cable. A structured socket disposed on the functional side has a nonconductive portion and a terminal set portion. The nonconductive portion is configured to insert within a corresponding nonconductive portion of the functional module so as to provide a fully enclosed shield as the terminal set portion receives a corresponding conductive portion of the functional module.

In one embodiment, the functional module comprises a front cover defining the front side and a back cover defining the back side. The front cover has a latch, and the back cover has a corresponding catch. The covers are configured to attach together, with the latch securing to the catch, so as to enclose at least a portion of the contact set. The functional module may have a key identifying a functional module type and insuring proper orientation of the functional module with respect to the wiring module according to its type. In a particular embodiment, the functional module is a switch type and the key is a nonconductive bar positioned off-center on, and extending from, the back cover.

In one embodiment, the wiring module further comprises a front cover defining the functional side, a back cover defining the wiring side, and a bracket configured to mount the wiring module to the box. The covers attach together so as to enclose at least a portion of the terminal set and to secure the bracket between the covers. The terminal set may comprise a plurality of terminal blocks each adapted to terminate either four 14 gauge wires or two 12 gauge wires.

In another embodiment, the wiring module further comprises a front cover defining the functional side, a back cover defining the wiring side, and a bracket disposed around the back cover and secured to the front cover so as to hold together the front and back covers. The bracket is configured to mount the wiring module to the box and to ground the functional module. In a particular embodiment, the back cover defines a plurality of wire apertures and the terminal set comprises a plurality of fixed wire terminals and a corresponding plurality of fixed wires. Each of the fixed wires has a striped wire end and a connector end and extend through a corresponding one of the wire apertures. The striped wire ends connect to the fixed wire terminals. The connector end is adapted to terminate at least a portion of the power cable.

A further aspect of a safety module electrical distribution system is a functional module adapted to removably connect to a wiring module mounted within an electrical box and connected to a power cable. The functional module has a front side providing access to an electrical function, an opposite back side, and a contact set. A shielded plug disposed on the back side has an insulating shield disposed around a plug portion of the contact set. The insulating shield is configured to both plug into and accept corresponding nonconductive portions of the wiring module so as to fully enclose the plug portion when in electrical communication with the power cable.

In some embodiments, an electrical distribution apparatus comprises: a housing having a front cover with a front face that defines an electrical distribution function, and a back cover with a back face having a plurality of shielded plugs; an electrical contact set at least partially enclosed by the housing, wherein said electrical contact set is adapted to communicate electrical power via said shielded plugs for said electrical distribution function, and wherein each of the shielded plugs comprises a prong and a wall protruding from the back face, the wall disposed around the prong and protruding further than the prong.

In some embodiments, an electrical distribution apparatus comprises: a non-electrically conductive body comprising a front side and a back side; a first set of one or more connectors proximate the front side configured to couple with a removable electrical outlet module or a removable electrical switch module, the first set of one or more connectors each comprising a mechanical connector portion and an electrical connector portion, the electrical connector portion configured so as not to be exposed to user contact when the mechanical connector portion is at least partially engaged with a complementary mechanical connector portion of the removable electrical outlet module or the removable electrical switch module; a second set of one or more connectors proximate the back side configured to electrically couple with one or more electrical power cables; and one or more electrical conductors within the body configured to electrically couple the first set of one or more connectors with the second set of one or more connectors.

In some embodiments, an electrical distribution apparatus comprises: a non-electrically conductive body comprising a user-accessible front side and a back side; a first set of one or more connectors proximate the back side configured to couple with a wiring module connected to a source of electrical power, the first set of one or more connectors each comprising a mechanical connector portion and an electrical connector portion, the electrical connector portion configured so as not to be exposed to user contact when the mechanical connector portion is at least partially engaged with a complementary mechanical connector portion of the wiring module.

BRIEF DESCRIPTION OF THE DRAWINGS

FIGS. 3-8 are perspective views of an outlet module and outlet module components;

FIGS. 9-15 are perspective views of a switch module and switch module components;

FIGS. 9A-B are front and back perspective views, respectively, of a switch module;

FIG. 10 is an exploded, front perspective view of a switch module;

FIGS. 13A-B are front and back perspective views, respectively, of a switch module single-pole, single throw (SPST) contact set;

FIGS. 16-22 are perspective views of a wiring module and wiring module components;

FIGS. 16E-F are front and back views, respectively, of a terminal-block wiring module and position-dependent wiring labels;

FIGS. 16G-H are switch and outlet wiring schematics, respectively;

FIG. 21 is a perspective view of a wiring panel terminal set;

FIGS. 23A-B are front and back perspective views, respectively, of a dimmer switch module;

DETAILED DESCRIPTION OF THE PREFERRED EMBODIMENT

System Overview

Figure 1A:
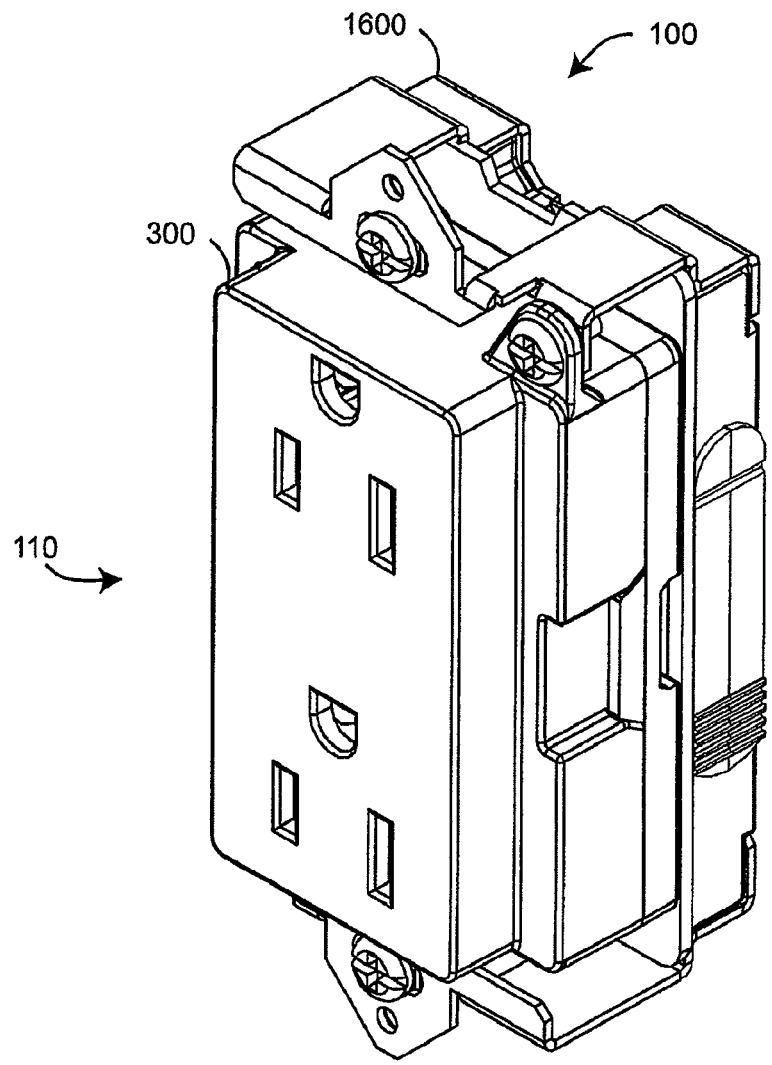
FIGS. 1A-B are perspective views of an outlet module installed and removed, respectively, from a corresponding wiring module.
Figure 1B:
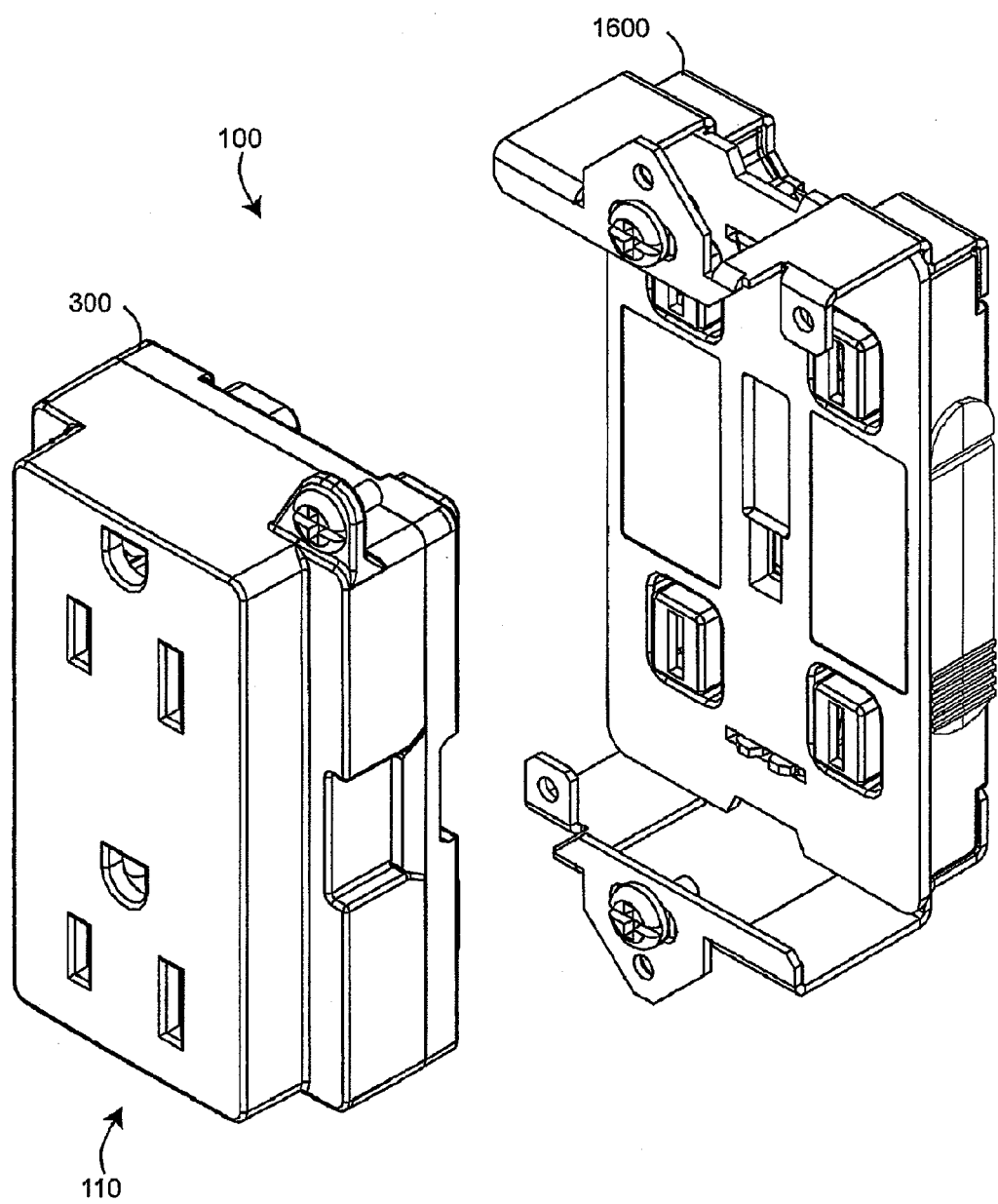
Figure 2A:
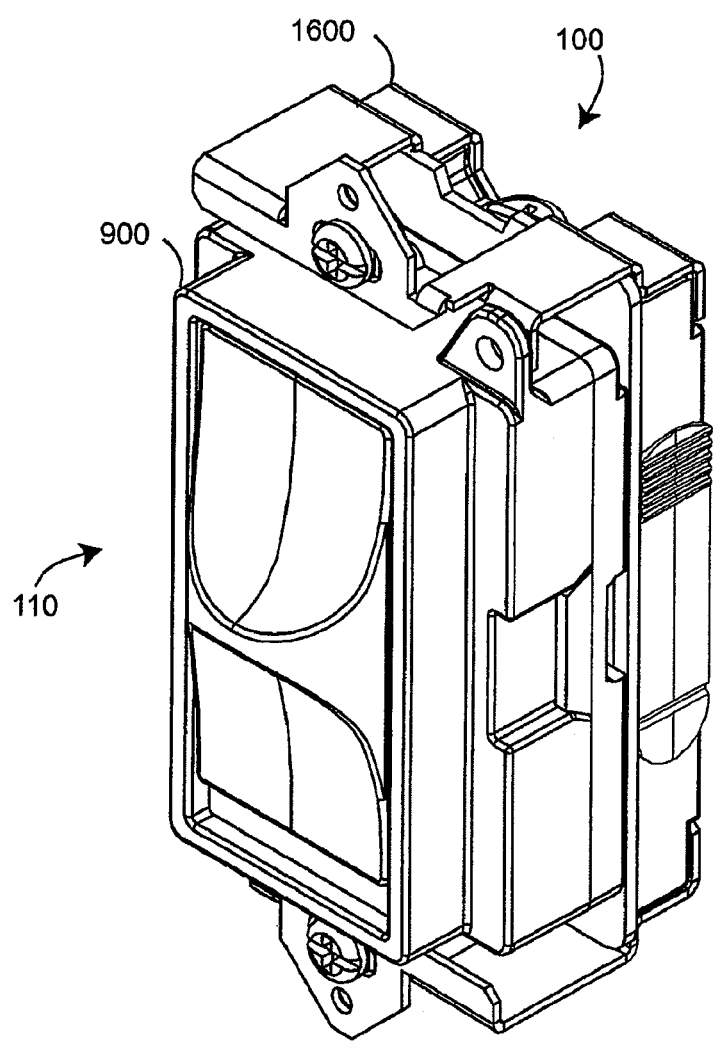
FIGS. 2A-B are perspective views of a switch module installed and removed, respectively, from a corresponding wiring module.
Figure 2B:
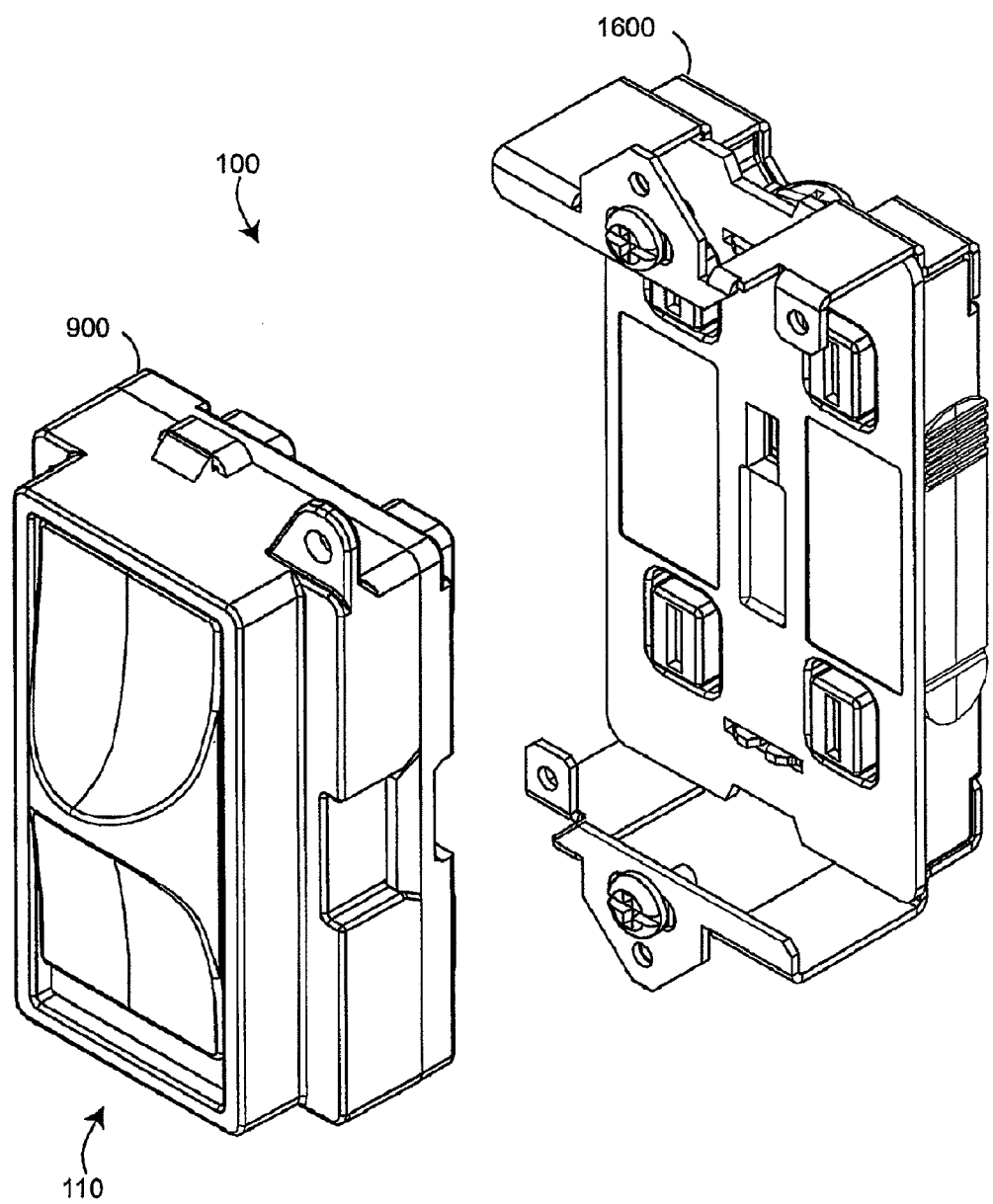

FIGS. 1-2 illustrate a safety module electrical distribution system 100 having a functional module 110 and a wiring module 1600. The electrical distribution system 100 is configured to mount within a standard electrical box (not shown), such as is typically installed within a building wall. In particular, the wiring module 1600 is configured to be easily installed within an electrical box, and a functional module 110 is configured to be removably plugged into the wiring module 1600, as described below. FIGS. 1A B show an outlet module 300 in an installed and a removed position, respectively. FIGS. 2A-B show a switch module 900 in an installed and a removed position, respectively. A face plate (not shown) may be installed over a functional module 110 so as to provide an aesthetic trim.

As shown in FIGS. 1-2, each functional module 110 provides a user-accessible electrical distribution function. As shown in FIGS. 1A-B, the functional module 110 may be an outlet module 300, which functions to supply a user with electrical power through a conventional AC plug inserted into one of the module sockets. The outlet module 300 is configured for installation in a ground-up position in a wiring module 1600 oriented for outlet installation. Alternatively, an outlet module and wiring module can be configured for outlet installation in a ground-down position.

As shown in FIGS. 2A-B, the functional module 110 may be a switch module 900, which allows a user to control electrical power to an outlet, a light or any of various electrical devices (not shown) by actuating the module switch. The switch is slidable between first and second positions in contrast to a conventional toggle switch, such as used for turning an interior light on and off. The switch module 900 is configured for installation in a wiring module 1600 oriented for switch installation. Reversible wiring module 1600 orientation within an electrical box to indicate the module to be installed and its proper orientation is described in detail with respect to FIGS. 16A-H, below Other outlet and switch related functional modules 110 may include GFCI outlets, covered safety outlets and dimmer switches (FIGS. 23-24) to name just a few. Further, the electrical distribution system 100 may be wall-mounted, ceiling-mounted or floor-mounted. In additional, the electrical distribution system 100 can be adapted for uses other than building electrical distribution, such as airplane, automobile or boat electrical distribution applications, to name a few. A modular electrical outlet and switch system is described in U.S. Pat. No. 6,341,981 entitled Safety Electrical Outlet and Switch System, and a covered safety outlet module is described in U.S. patent application Ser. No. 10/737,713 entitled Safety Outlet Module, both assigned to ProtectConnect, Irvine, Calif. and incorporated by reference herein.

Outlet Module

Figure 3A:
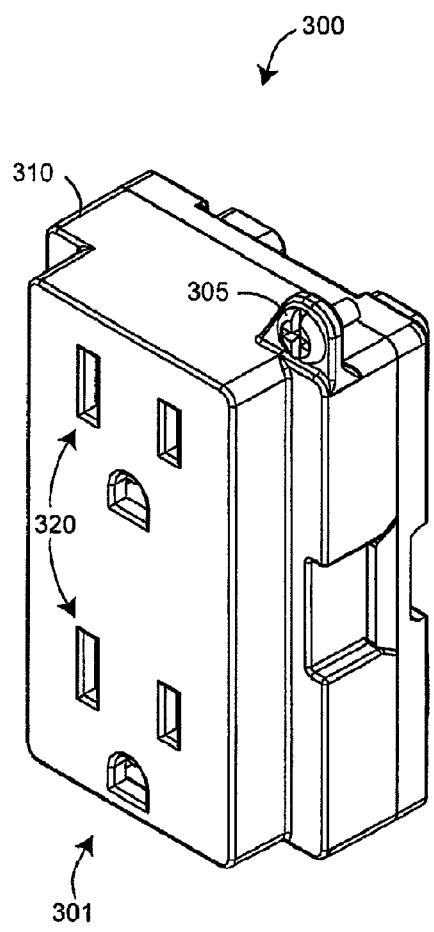
FIGS. 3A-B are front and back perspective views, respectively, of an outlet module.
Figure 3B:
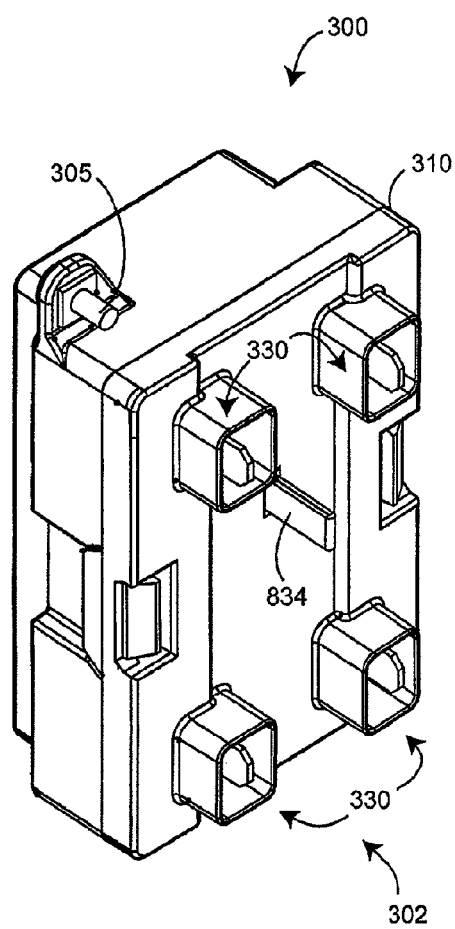

FIGS. 3A-B illustrate an outlet module 300 having a body 310, a front side 301 and a back side 302. The body 310 accepts attachment screws 305 on diagonally opposite corners that are utilized to secure the outlet module 300 to a wiring module 1600 (FIGS. 1A-B). The outlet module front side 301 provides upper and lower sockets 320 each configured to accept a conventional, three-wire (grounded) electrical plug. The outlet module back side 302 provides shielded plugs 330 and a ground bar 834 that physically and electrically connect the outlet module 300 to a wiring module 1600 (FIGS. 1A-B). The shielded plugs 330 transfer electrical power to the sockets 320, and the ground bar 834 provides a ground path for the sockets 320. The ground bar 834 also functions as a key to assist in orienting the outlet module 300 relative to the wiring module 1600 (FIGS. 1A-B).

Figure 4A:
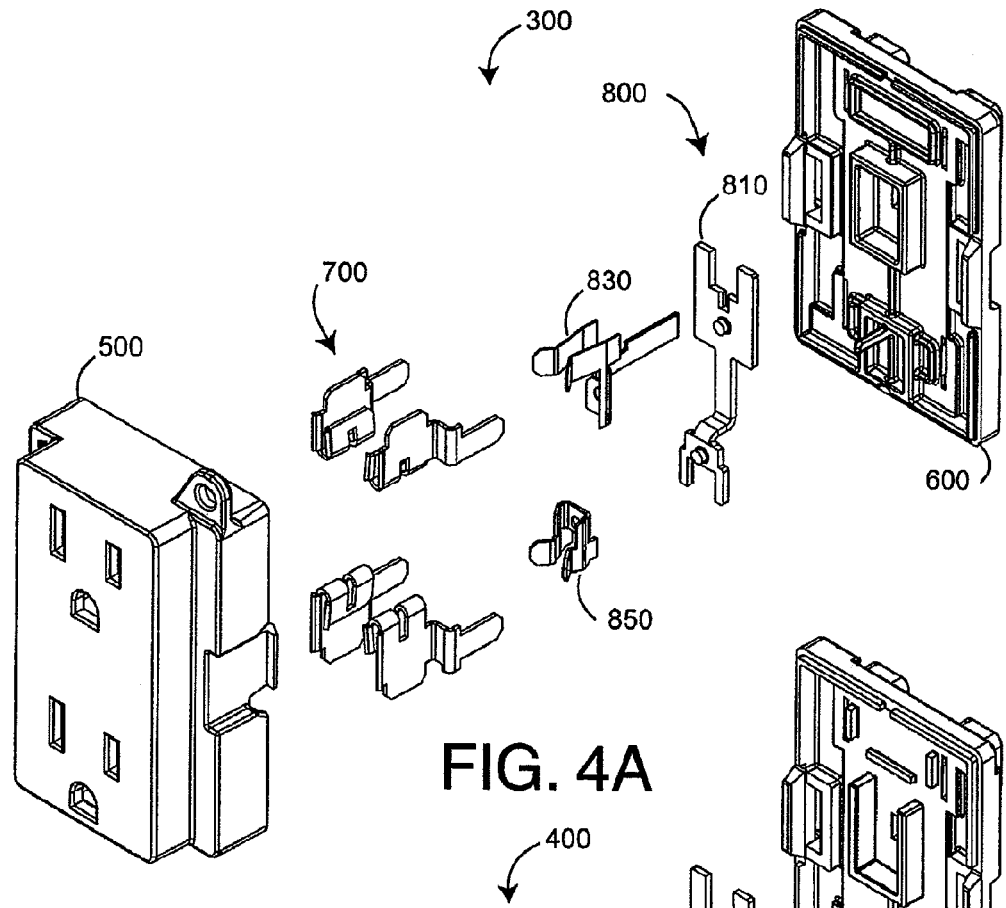
FIGS. 4A-B are exploded, front perspective views of outlet modules.
Figure 4B:
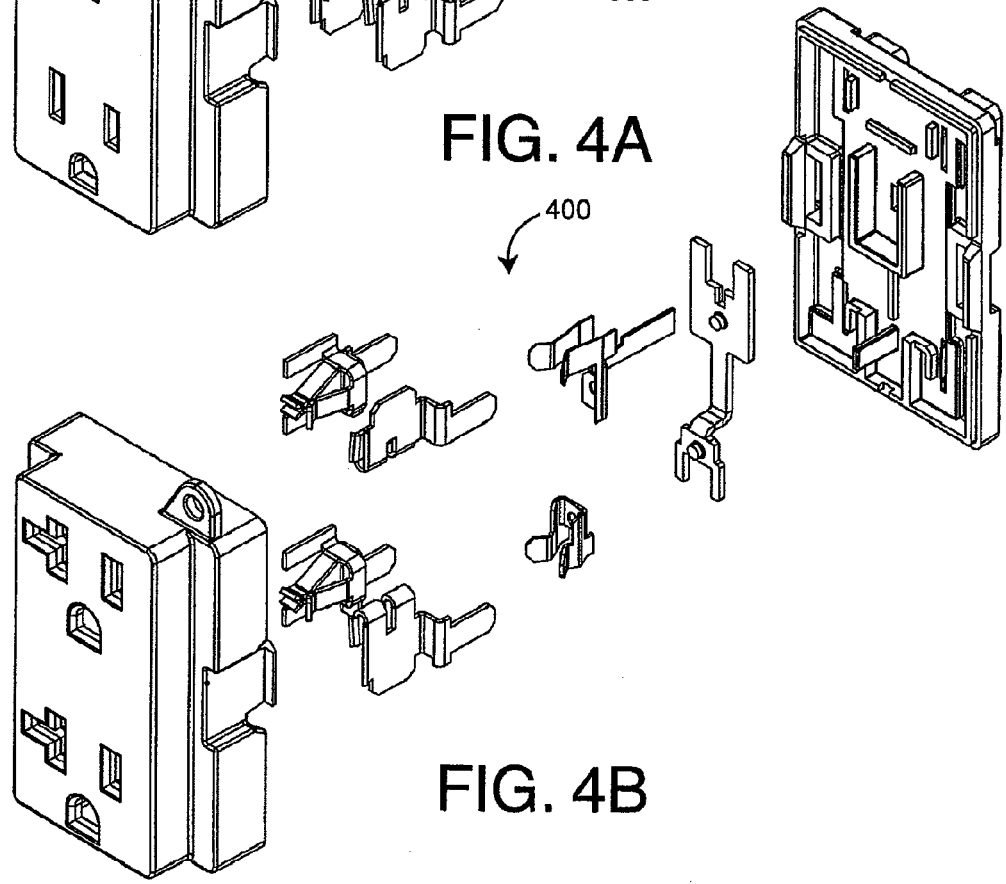
Figure 5A:
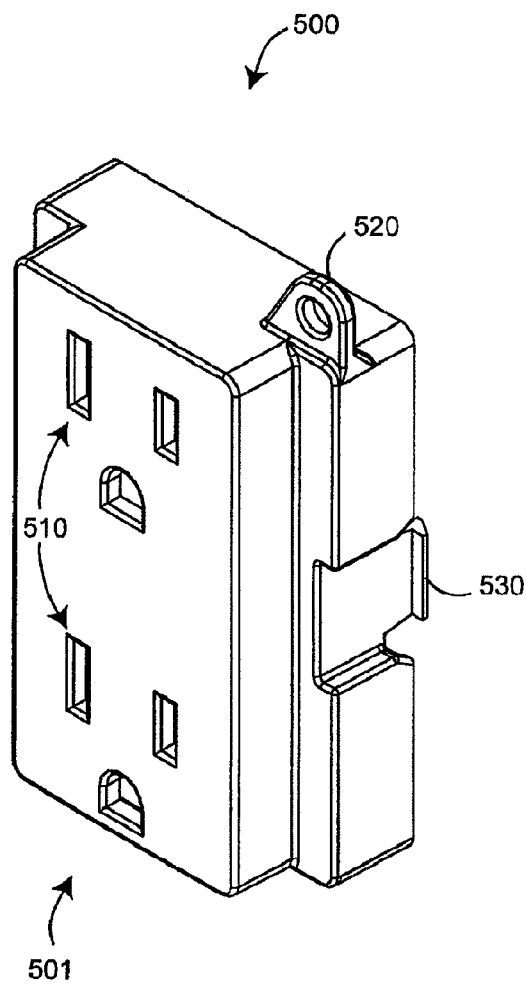
FIGS. 5A-B are front and back perspective views, respectively, of an outlet module front cover.
Figure 5B:
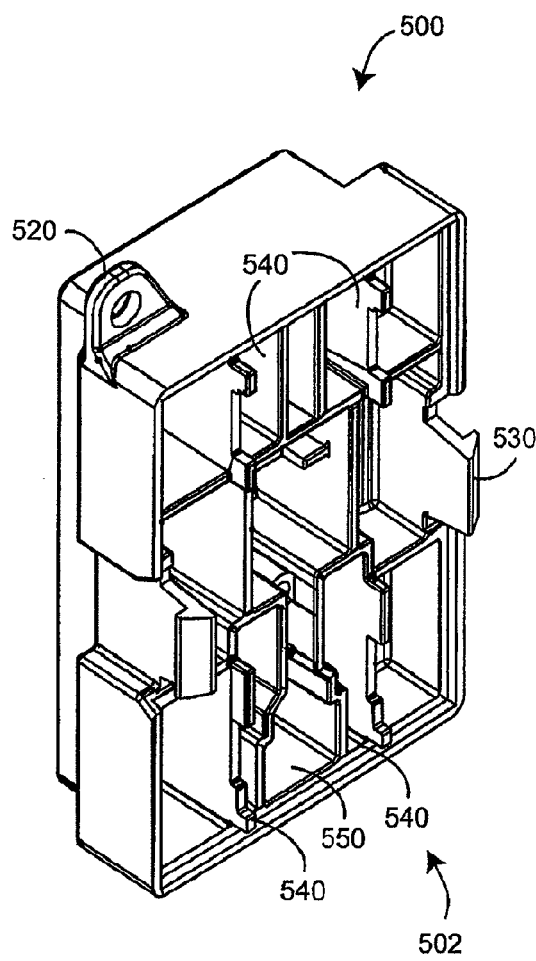
Figure 16A:
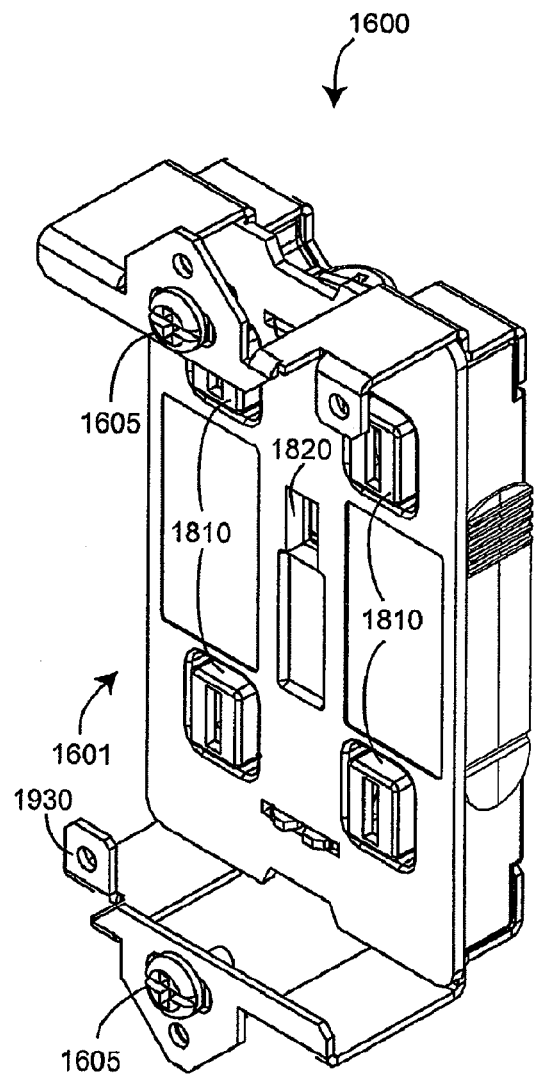
FIGS. 16A-B are front and back perspective views, respectively, of a terminal-block wiring module.
Figure 16B:
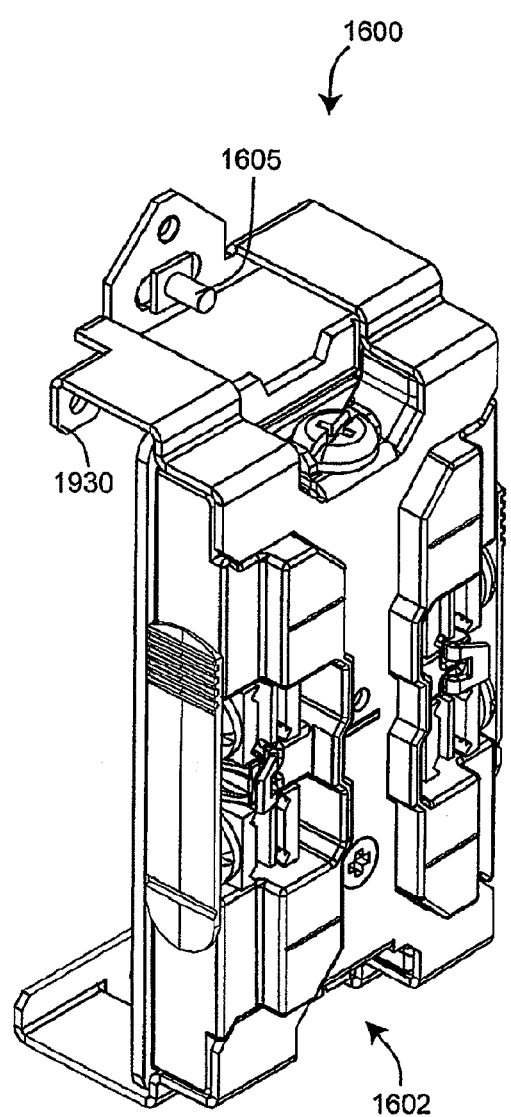

FIG. 4A illustrates an outlet module 300 having a front cover 500, a rear cover 600, a power contact set 700 and a ground contact set 800. The front cover 500 and back cover 600 form the outlet module body 310 (FIGS. 3A-B). The covers 500, 600 advantageously snap together with a latch and catch assembly, described with respect to FIGS. 5-6, below. This reduces manufacturing assembly steps and reduces or eliminates the need for separate fasteners, such as rivets or screws and/or sonic welding. The contact set 700, 800 is retained within the covers 500, 600 and provides conductive paths from the wiring panel 1600 (FIGS. 16A-B) to the outlet sockets 320 (FIG. 3A). In particular, a power contact set 700 transfers power from the shielded plugs 330 (FIG. 3B) to the outlet sockets 320 (FIG. 3A). A ground contact set 800 provides a ground path between a ground bar 834 (FIG. 3B) and the outlet sockets 320 (FIG. 3A). The ground contact set components 810, 830, 850 are assembled as described with respect to FIGS. 8A-B, below. In one embodiment, the covers 500, 600 are constructed of nylon. FIG. 4B illustrates an alternative embodiment of an outlet module 400, such as for 20A applications FIGS. 5A-B illustrate the outlet module front cover 500 having an outside face 501, an inside face 502, outlet apertures 510, attachment ears 520, side latches 530 and contact housing structure 540, 550. As shown in FIG. 5A on the outside face 501, the outlet apertures 510 form the entry to the outlet module sockets 320 (FIG. 3A) and include a hot slot, neutral slot and ground hole for each of a top socket and bottom socket. The attachment ears 520 are advantageously integral to the front cover 500, eliminating the need for a separate mechanism for attaching the outlet module 300 (FIGS. 3A-B) to the wiring module 1600 (FIGS. 16A-B). The attachment ears 520 are located at an upper right corner and a diagonally opposite lower left corner (not visible), and each has a fastening aperture that accepts, for example, an attachment screw 305 (FIGS. 3A-B). The side latches 530 form the front cover portion of the latch and catch assembly, functionally described with respect to FIG. 4, above.

As shown in FIG. 5B on the inside face 502, a power contact structure 540 accepts the power contact set 700 (FIGS. 7A-B) so that the power contact clips 701 (FIGS. 7A-B) align with the hot and neutral slots of the outlet apertures 510. A ground contact structure 550 accepts the ground contact set 800 (FIGS. 8A-B) so that the ground contact clips 832, 852 (FIGS. 8A-B) align with the ground holes of the outlet apertures 510.

Figure 6A:
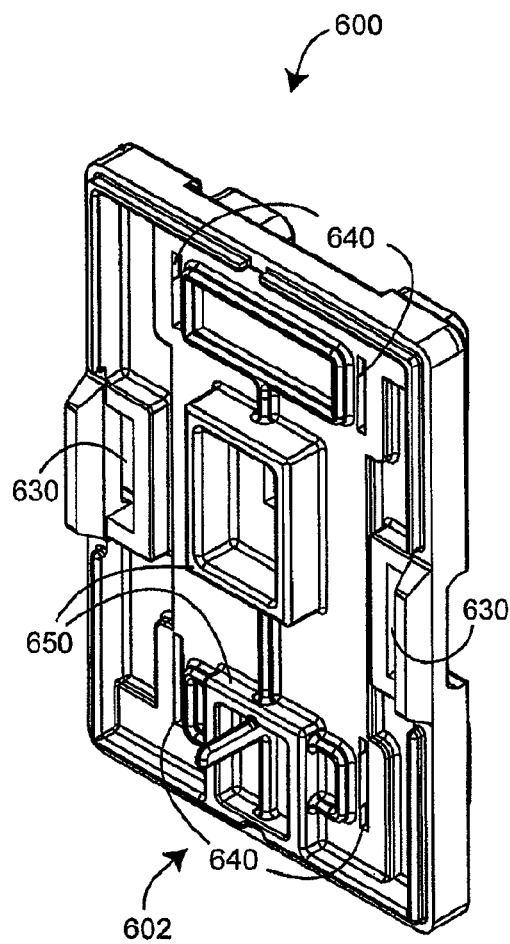
FIGS. 6A-B are front and back perspective views, respectively, of an outlet module back cover.
Figure 6B:
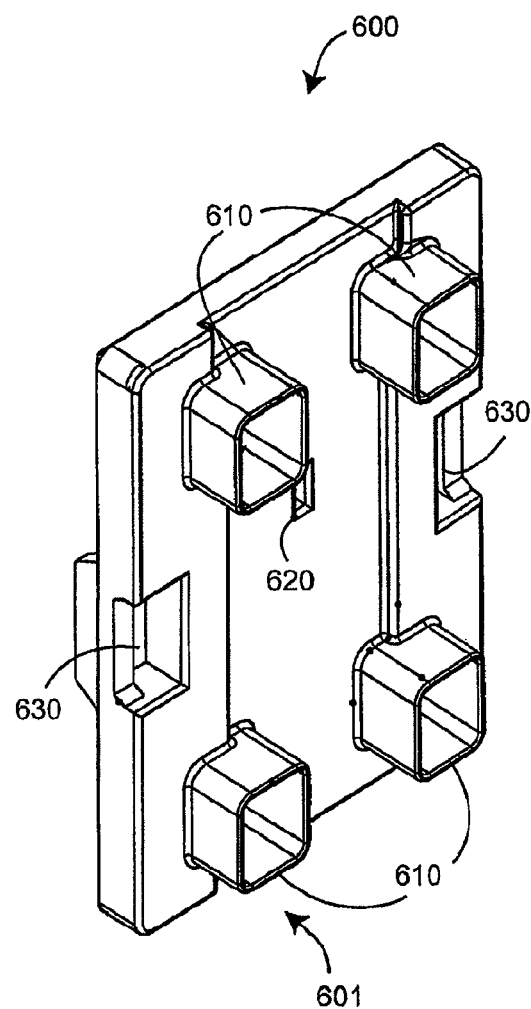
Figures 7A, 7B:
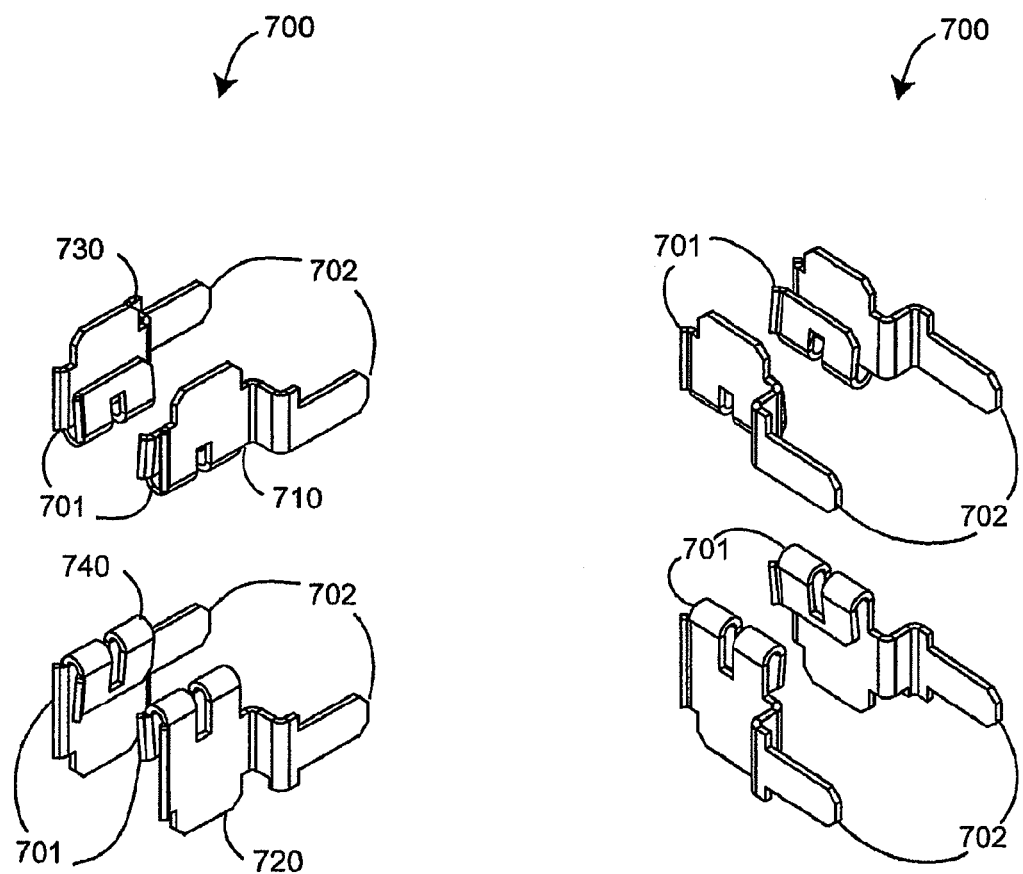
FIGS. 7A-B are front and back perspective views, respectively, of an outlet module power contact set.

FIGS. 6A-B illustrate the outlet module back cover 600 having an outside face 601, an inside face 602, plug shields 610, a ground bar aperture 620, side catches 630 and contact support structure 640, 650. As shown in FIG. 6B on the outside face 601, the plug shields 610 advantageously provide the shield portion of the shielded plugs 330 (FIG. 3B). Specifically, the plug shields 610 completely surround all sides of the power contact set prongs 702 (FIGS. 7A-B). In this manner, the prongs 702 (FIGS. 7A-B) are not exposed when the outlet module plugs 330 (FIG. 3B) are engaged with the wiring module sockets 810 (FIG. 18A), even when the outlet module 300 (FIGS. 3A-B) is partially separated from the wiring module 1600 (FIGS. 16A-B). The ground bar aperture 620 allows the ground bar 834 (FIGS. 8A-B) to protrude through the back cover 600, providing a ground contact with the wiring module 1600 (FIGS. 16A-B). The side catches 630 provide apertures that accept and engage the side latches 530 (FIGS. 5A-B) so as to releasably secure together the front cover 500 (FIGS. 5A-B) and the back cover 600.

As shown in FIG. 6A on the inside face 602, a power contact support structure 640 consists of slots that allow the prongs 702 (FIGS. 7A-B) to protrude through the back cover 600 within the plug shields 610, providing a power connection with the wiring module 1600 (FIGS. 16A-B). A ground contact support structure 650 supports the ground contact set 800 (FIGS. 8A-B).

FIGS. 7A-B illustrate the power contact set 700 having an upper hot contact 710, a lower hot contact 720, an upper neutral contact 730 and a lower neutral contact 740. Each contact 710 740 has a prong clip 701 interconnected with a prong 702. The prong clips 701 align with the front cover hot and neutral slots 510 (FIG. 5A) to form the outlet module sockets 320 (FIG. 3A). The prongs 702 insert through the power contact support structure 640 into the plug shields 610 to form the outlet module shielded plugs 330 (FIG. 3B).

Advantageously, the power contact set 700 is configured so that the contacts may be manufactured by a stamp and fold process. In one embodiment, the contacts are brass.

Figures 8A, 8B:
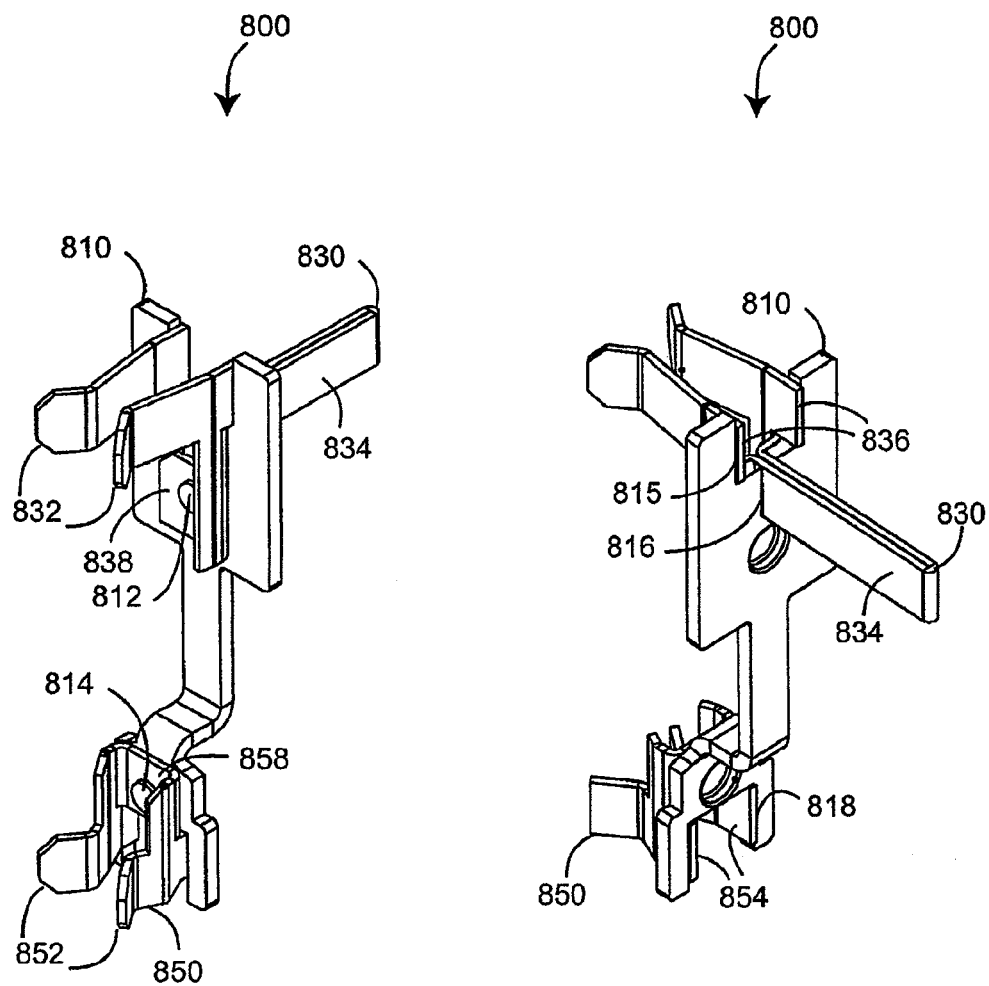
FIGS. 8A-B are front and back perspective views, respectively, of an outlet module ground contact set.

FIGS. 8A-B illustrate a ground contact set 800 having a ground buss 810, an upper ground contact 830 and a lower ground contact 850. The ground clips 832, 852 align with the front cover ground holes 510 (FIG. 5A) to form the ground portion of the outlet module sockets 320 (FIG. 3A). The ground bar 834 protrudes through the back cover 600 (FIGS. 6A-B) to provide a ground path connection with the wiring module 1600 (FIGS. 16A-B). The unassembled ground contact set 800 is illustrated in FIG. 4, above. Ground contact set 800 assembly is described below.

As shown in FIGS. 8A-B, the ground buss 810 has an upper rivet 812, a lower rivet 814, an upper cutout 815, a slot 816 and a lower cutout 818. The ground buss 810 mechanically supports and electrically interconnects the upper ground contact 830 and the lower ground contact 850. The upper ground contact 830 has an upper ground clip 832, a ground bar 834, leaves 836 and a tab 838. The upper ground clip 832 and ground bar 834 extend from opposite ends of the upper ground contact 830. The upper ground clip 832 accepts a ground pin from a standard AC electrical plug. The ground bar 834 inserts into a corresponding ground clip 1902 (FIGS. 19A-B) in the wiring module 1600 (FIGS. 16A-B). The tab 838 extends generally perpendicularly below and between the clip 832 and bar 834 and has an aperture corresponding to the top rivet 812. The leaves 836 extend from the back of the clip 832. The lower ground contact 850 has a lower ground clip 852, leaves 854 and a tab 858. The tab 858 extends generally perpendicularly to the clip 852 and has an aperture corresponding to the lower rivet 814. The leaves 854 extend from the back of the clip 852.

Also shown in FIGS. 8A-B, the ground contact set 800 is assembled by inserting the upper ground contact 830 and lower ground contact 850 into the ground buss 810. Specifically, the ground bar 834 is inserted into the slot 816, the leaves 836, 854 are inserted into the upper and lower cutouts 815, 818, respectively, and the upper and lower rivets 812, 814 are inserted through the tabs 838, 858. The rivets 812, 814 are then splayed, fixedly attaching the upper and lower ground contacts 830, 850 to the ground buss 810. Advantageously, the ground contact set 800 is configured so that the ground contact set components 810, 830, 850 may be manufactured by a stamp and fold process. In one embodiment, the upper and lower ground contacts 830, 850 are brass and the ground buss 810 is zinc-plated steel.

Switch Module

FIGS. 9A-B illustrate a switch module 900 having a body 910, a front side 901 and a back side 902. Like the outlet module body 310 (FIGS. 3A-B), the switch module body 910 accepts screws on diagonally opposite corners that are utilized to secure the switch module 900 to a wiring module 1600 (FIGS. 2A-B). The switch module front side 901 has a slidable switch 1100 configured to actuate internal contacts so as to route electrical power, to turn on and off a light, for example. Like the outlet module 300 (FIGS. 3A-B), the switch module back side 902 provides shielded plugs 930 that physically and electrically connect the switch module 900 to a wiring module 1600 (FIGS. 2A-B). The shielded plugs 930 conduct electrical power under control of the switch 1100. There may be null plugs 940 having no conductors depending on the switch module 900 configuration and associated function, as described with respect to FIGS. 13A-F, below. The switch module 900 does not require a ground path to the wiring module 1600 (FIGS. 2A-B). A key bar 1520, therefore, provides a non-conducting structure that substitutes for a ground bar 834 (FIG. 3B), to assist in orienting the switch module 900 relative to the wiring module 1600 (FIGS. 2A-B).

Figure 10:
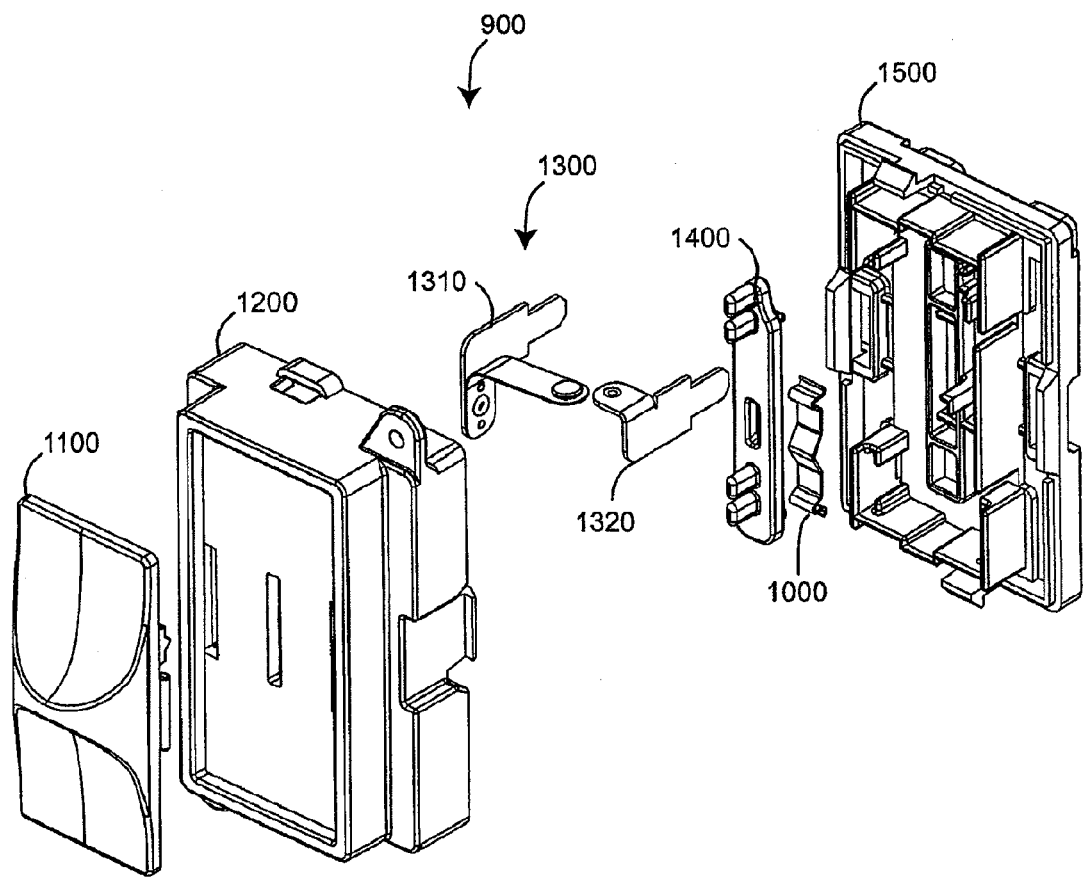

FIG. 10 illustrates a switch module 900 having a switch 1100, a front cover 1200, a rear cover 1500, a contact set 1300, an actuator 1400 and a spring 1000. The front cover 1200 and back cover 1500 form the switch module body 910 (FIGS. 9A-B). The covers 1200, 1500 advantageously snap together and are secured with a latch and catch assembly, described with respect to FIGS. 12A-B and 15A-B, below. This reduces manufacturing assembly steps and reduces or eliminates the need for separate fasteners, such as rivets or screws and/or sonic welding. In one embodiment, the covers 1200, 1500 are constructed of nylon.

As shown in FIG. 10, the switch 1100 snaps into and is slidably retained by the front cover 1200 and engages the actuator 1400. The switch 1100 is movable between a first position and a second position. The contact set 1300, actuator 1400 and spring 1000 are retained within the covers 1200, 1500. The contact set 1300 routes electrical power from the wiring panel 1600 (FIGS. 1A-B) as determined by the switch 1100 positions. In particular, the position of the switch 1100 determines the position of the actuator 1400, which, in turn, determines whether the contact set 1300 is open or closed. If closed, the contact set 1300 provides a conductive path that transfers power between the shielded plugs 930 (FIG. 3B). The switch 1100 remains in its manually set position under tension from the spring 1000.

Figure 11A:
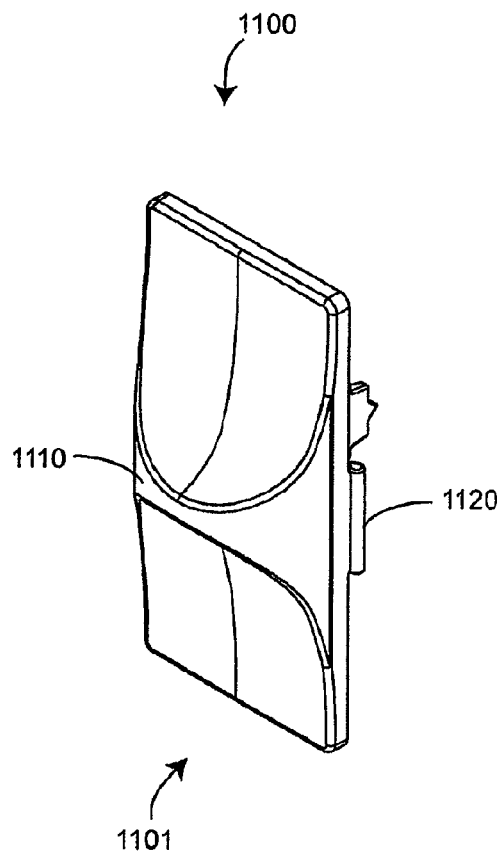
FIGS. 11A-B are front and back perspective views, respectively, of a switch module switch.
Figure 11B:
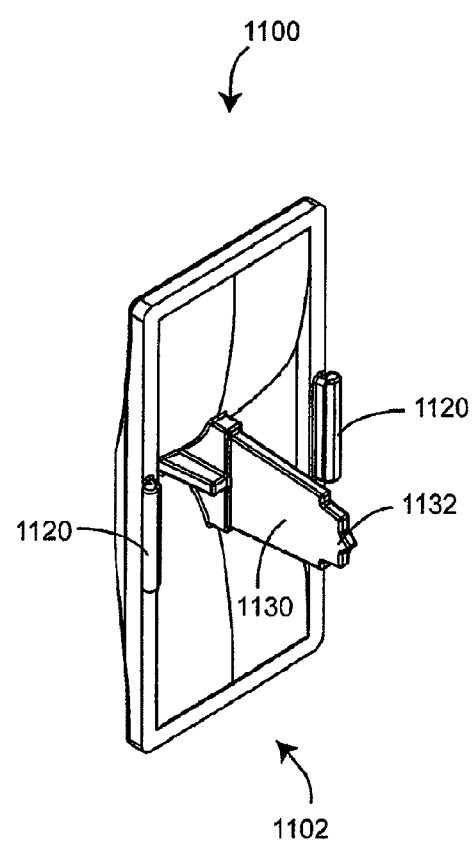
Figures 12A, 12B:
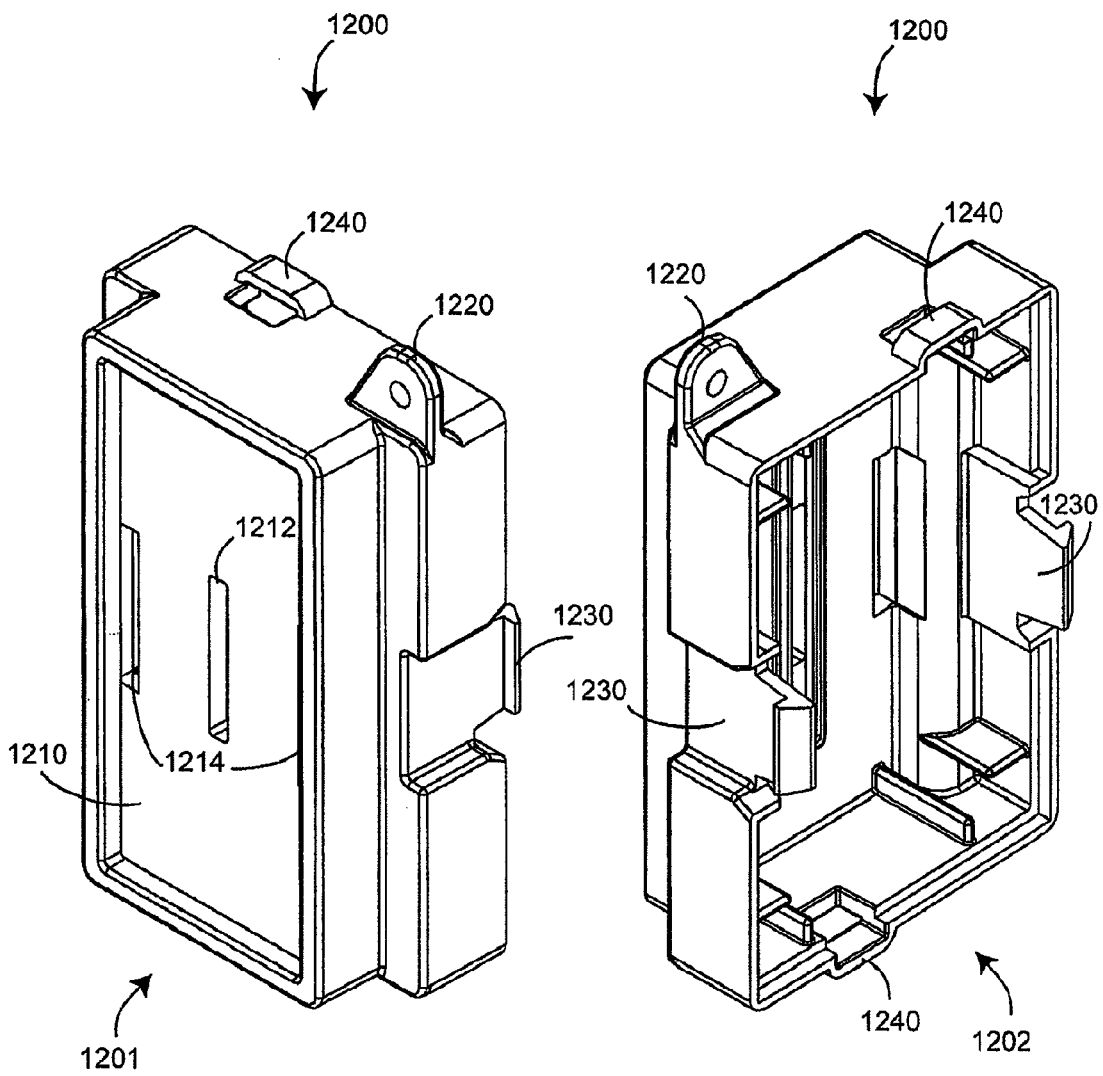
FIGS. 12A-B are front and back perspective views, respectively, of a switch module front cover.
Figure 14A:
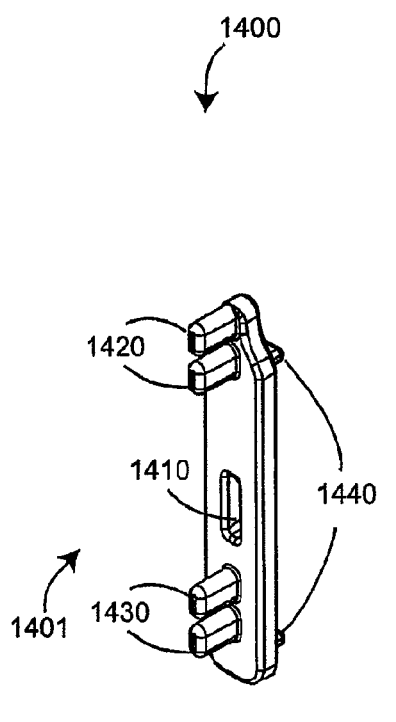
FIGS. 14A-B are front and back perspective views, respectively, of a switch module actuator.
Figure 14B:
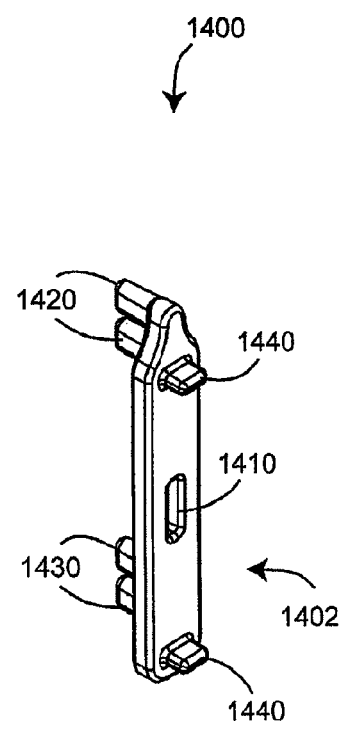

FIGS. 11A-B illustrate a switch 1100 that is generally rectangular, having a front side 1101 and a back side 1102. The front side 1101 has a finger grip 1110 for manually sliding the switch between its first position and its second position, as described above. The back side 1102 has latches 1120 and a lever 1130 that extends in a direction generally normal to the plane of the back side 1102. The latches 1120 are configured to pass through front cover slots 1214 (FIG. 12A), which cause the latches 1120 to flex inward toward the extension 1130 as the switch 1100 is pressed into the front cover 1200 (FIGS. 12A-B). The latches 1120 spring outward after the latches pass through the slots 1214 (FIG. 12A), seating the switch in the front cover 1200 (FIGS. 12A-B), as described below. The lever tip 1132 inserts through the actuator slot 1410 (FIGS. 14A-B) and contacts the spring 1000, mechanically connecting the switch 1100 to the actuator 1400 (FIGS. 14A-B).

FIGS. 12A-B illustrate a front cover 1200 having an outside face 1201, an inside face 1202, a switch cavity 1210, attachment ears 1220, side latches 1230 and top and bottom catches 1240. Located on the outside face 1201, the cavity 1210 is configured to accommodate the switch 1100 (FIGS. 11A-B). Within the cavity 1210 is a lever slot 1212 that allows the switch lever 1130 (FIG. 11B) to pass through the front cover to the actuator 1400 (FIGS. 14A-B). The lever slot 1212 extends along the cavity 1210 a sufficient distance to allow switch movement between first and second positions, as described above. Also within the cavity 1210 are catch slots 1214 that accommodate and capture the switch latches 1120 (FIG. 11B), as described above. The attachment ears 1220 are located at an upper right corner and a diagonally opposite lower left corner (not visible), and each has a fastening aperture that accepts, for example, an attachment screw 305 (FIGS. 3A-B). The side latches 1230 and top and bottom catches 1240 form the front cover portion of the latch and catch assembly, functionally described with respect to FIG. 10, above.

FIGS. 13A-B illustrate a SPST contact set 1300 having a throw buss 1310 and a pole buss 1320. The throw buss 1310 has a first prong 1312, a flexible throw 1314 and a throw contact 1318. The pole buss 1320 has a second prong 1322, a fixed pole 1324 and a pole contact 1328. The first and second prongs 1312, 1322 form the conductive portion of the shielded plugs 930 (FIG. 9B). The flexible throw 1314 engages the actuator 1400, as described with respect to FIGS. 14A-B, below, which moves the throw between an open position and a closed position (shown). In the closed position, the throw contact 1318 touches and electrically connects with the pole contact 1328, establishing a conductive path between the first and second prongs 1312, 1322. In the open position, the throw contact 1318 is separated from the pole contact 1328 so that there is no conductive path between the first and second prongs 1312, 1322.

Figure 13C:
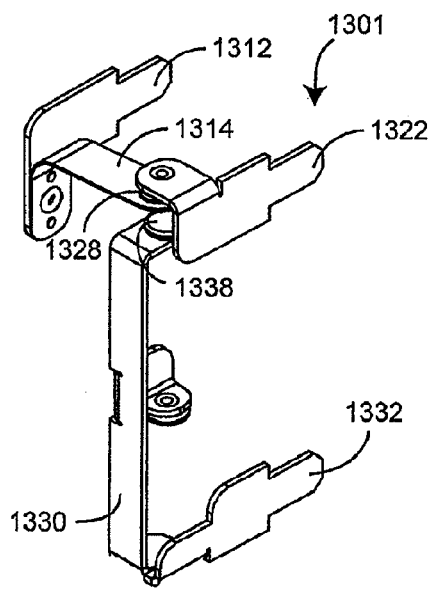
FIGS. 13C-D are front and back perspective views, respectively, of a switch module single-pole, double throw (SPDT) contact set.
Figure 13D:
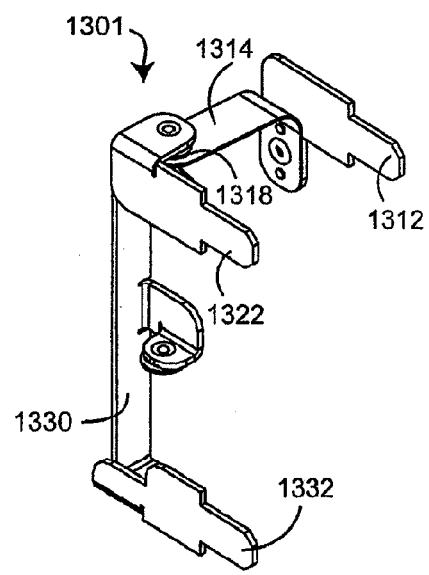

FIGS. 13C-D illustrate a SPDT contact set 1301 for a 3-way switch having a second pole buss 1330 in addition to the SPST contact set 1300 (FIGS. 13A-B). The second pole buss 1330 has a third prong 1332 and a second pole contact 1338. The flexible throw 1314 engages the actuator 1400, as described with respect to FIGS. 14A-B, below, which moves the throw between a first position (shown) and a second position. In a first position, the throw contact 1318 touches and electrically connects with the pole contact 1328, establishing a conductive path between the first and second prongs 1312, 1322. In a second position, the throw contact 1318 touches and electrically connects with the second pole contact 1338, establishing a conductive path between the first and third prongs 1312, 1332.

Figure 13E:
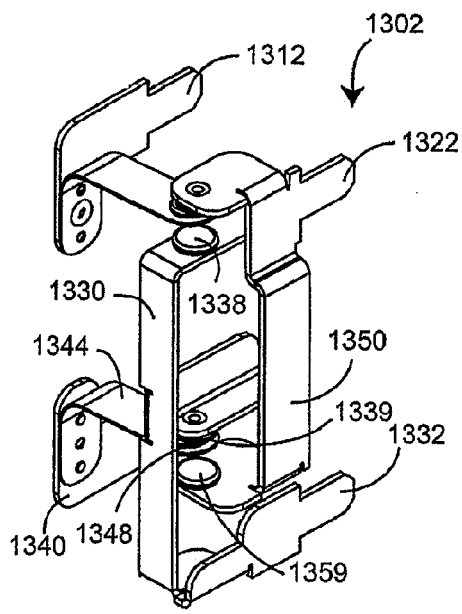
FIGS. 13E-F are front and back perspective views, respectively, of a switch module double-pole, double throw (DPDT) contact set.
Figure 13F:
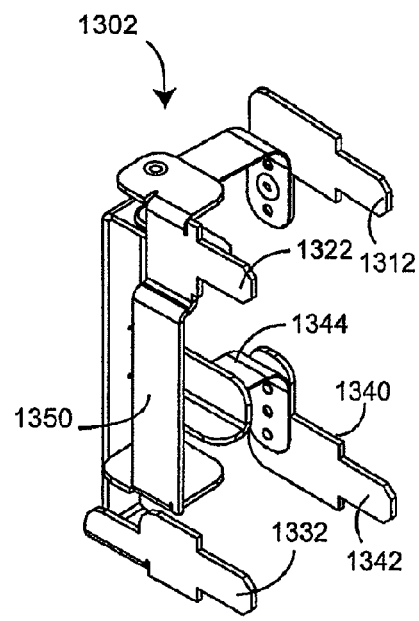

FIGS. 13E-F illustrate a DPDT contact set 1302 for a 4-way switch having a second throw buss 1340 and a third pole buss 1350 in addition to the SPDT contact set 1301. The second throw buss 1340 has a second flexible throw 1344. The second throw buss 1340 has a fourth prong 1342, a second flexible throw 1344 and a second throw contact 1348. The second pole buss 1330 has the third pole contact 1339, and the third pole buss 1350 has a fourth pole contact 1359. In a first position, the throw contact 1318 touches and electrically connects with the pole contact 1328, establishing a conductive path between the first and second prongs 1312, 1322. Also, the second throw contact 1348 touches and electrically connects with the third pole contact 1339, establishing a conductive path between the third and fourth prongs 1332, 1342. In a second position, the throw contact 1318 touches and electrically connects with the second pole contact 1338, establishing a conductive path between the first and third prongs 1312, 1332. Also, the second throw contact 1348 touches and electrically connects with the fourth pole contact 1339, establishing a conductive path between the second and fourth prongs 1322, 1342.

FIGS. 14A-B illustrate an actuator 1400 having a front face 1401, a back face 1402 and a lever slot 1410 generally centered within and passing through the front and back faces 1401, 1402. The actuator 1400 is positioned within the switch module 900 (FIG. 10) so that the front face 1401 is proximate the front cover 1200 (FIG. 10) and the contact set 1300 (FIG. 10) and the back face 1402 is proximate the spring 1000 (FIG. 10) and the back cover 1500 (FIG. 10). The lever slot 1410 accommodates the switch lever tip 1132 (FIG. 11B), as described above. The front face 1401 has a pair of upper arms 1420 and a pair of lower arms 1430 extending generally perpendicularly from the front face 1401 so as to engage the contact set 1300 (FIGS. 13A-B). In particular, the flexible throw 1314 (FIGS. 13A-B) is engaged between the upper arms 1420. For a DPDT contact set 1302 (FIGS. 13E-F), a second flexible throw 1344 (FIGS. 13E-F) is engaged between the lower arms 1430. The back face 1402 has a pair of posts 1440 that are slidably retained within back cover guides 1550 (FIG. 15A).

Figure 15A:
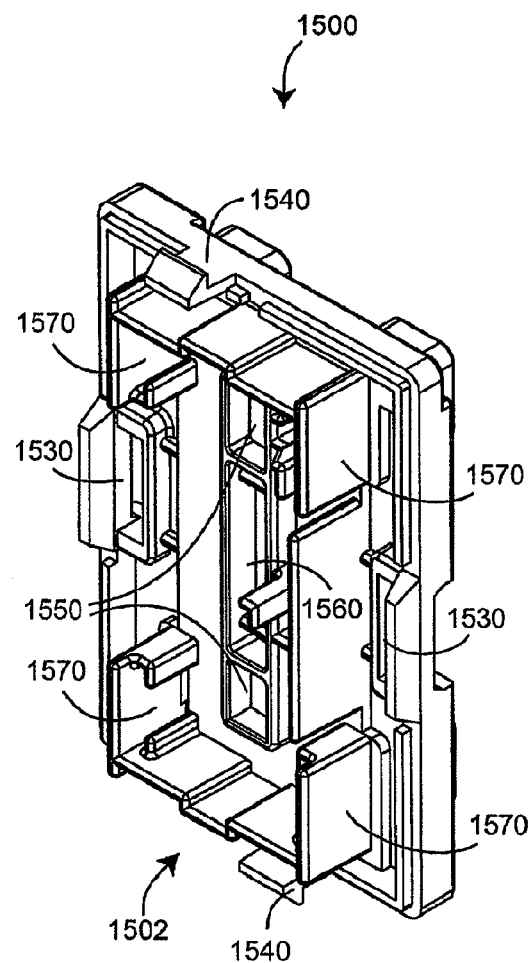
FIGS. 15A-B are front and back perspective views, respectively, of a switch module back cover.
Figure 15B:
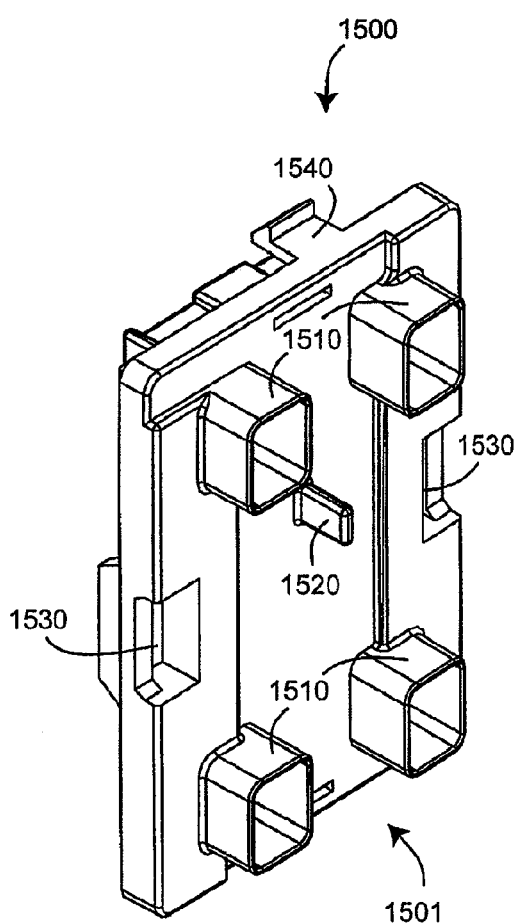

FIGS. 15A-B illustrate a rear cover 1500 having an inside face 1502, an outside face 1501, plug shields 1510, a key bar 1520, side catches 1530, top and bottom latches 1540, actuator guides 1550, a spring hold 1560 and contact support structure 1570. As shown in FIG. 15B on the outside face 1501, the plug shields 1510 advantageously provide the shield portion of the shielded plugs 930 (FIG. 9B). Specifically, the plug shields 1510 completely surround all sides of the contact set prongs 1312, 1322 (FIGS. 13A-B). In this manner, the prongs are not exposed when the switch module plugs 930 (FIG. 9B) are engaged with the wiring module sockets 1810 (FIG. 18A), even when the switch module 900 (FIGS. 9A-B) is partially separated from the wiring module 1600 (FIGS. 16A-B). The key bar 1520 is configured to insert into the wiring module ground socket 1820 (FIG. 18A), although the key bar 1520 is nonconductive. The key bar 1520 assists proper orientation of the switch module 900 (FIGS. 9A-B) to the wiring module 1600 (FIGS. 16A-B). The side catches 1530 provide apertures that accept and engage the side latches 1230 (FIGS. 12A-B), and the top and bottom latches 1540 insert into and engage the top and bottom catches 1240 (FIGS. 12A-B) so as to releasably secure together the front cover 1200 (FIGS. 12A-B) and the back cover 1500.

As shown in FIG. 15A on the inside face 1502, the actuator guides 1550 slidably retain the actuator posts 1440 (FIG. 14B). The spring hold 1560 accommodates and retains the spring 1000 (FIG. 10). The contact support structure 1570 consists of slots through the back cover 1500 and structure extending generally normal to the inside face 1502 that support the contact set 1300 (FIGS. 13A-B). The slots accept the contact set prongs 1312, 1322 (FIGS. 13A-B), which protrude through the back cover 1500 within the plug shields 1510.

Terminal-Block Wiring Module

FIGS. 16A-B illustrate a terminal-block wiring module 1600 having a functional side 1601 and a wiring side 1602. The functional side 1601 has structured sockets 1810 and an off-center ground socket 1820. The structured sockets 1810 accept corresponding functional module shielded plugs, as described with respect to FIG. 20A, below. The wiring module 1600 is configured to mount within a conventional electrical box (not shown), secured with attachment screws 1605. A functional module, such as an outlet module 300 (FIGS. 3A-B) or a switch module 900 (FIGS. 9A-B) plug into the wiring module functional side 1601, secured to the wiring module with attachment screws that thread through attachment ears and corresponding module mounts 1930, as described with respect to FIGS. 1-2, above. A power cable (not shown) routed into the electrical box attaches to a terminal block 1640 (FIG. 16F) accessible from the wiring module wiring side 1602, as described with respect to FIGS. 16E-H, below.

As shown in FIGS. 16A-B, a wiring module 1600 advantageously can be installed, wired and tested by journeyman electrician at the rough-in phase of building construction. The wiring module 1600 is mounted within an electrical box according to the type of functional module for which the wiring module 1600 will be wired. If the wiring module 1600 is mounted in a first orientation (FIG. 1B), the ground socket 1820 is positioned below-center. If the wiring module is mounted in a second orientation (FIGS. 2B, 16A), the ground socket 1820 is positioned above-center. The ground socket 1820 accepts an outlet module ground bar 834 (FIG. 3B) or switch module key bar 1520 (FIG. 9B), which act as keys. Correspondingly, the ground socket 1820 acts as a block that accepts a functional module key 834 (FIG. 3B), 1520 (FIG. 9B) only when the functional module is properly oriented with respect to the wiring module 1600 according to module type, such as a switch or outlet. In one embodiment, the wiring module 1600 is mounted with the ground socket 1820 above-center for a switch module 900 (FIGS. 9A-B) and mounted with the ground socket 1820 below-center for an outlet module 300 (FIGS. 3A-B), as described in further detail with respect to FIGS. 16E-H, below.

Figures 16C, 16D:
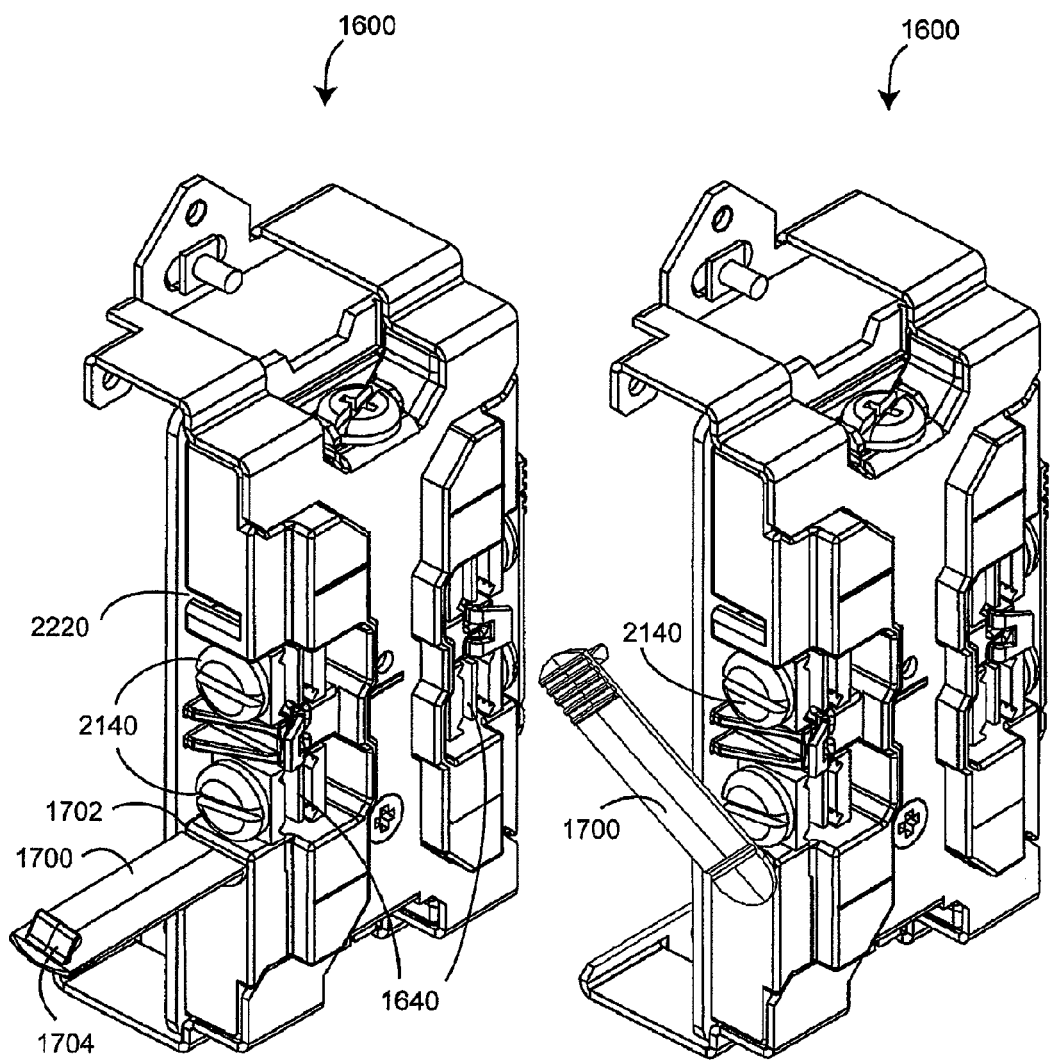
FIGS. 16C-D are back perspective views of a terminal-block wiring module and associated terminal guards in open positions.
Figure 21:
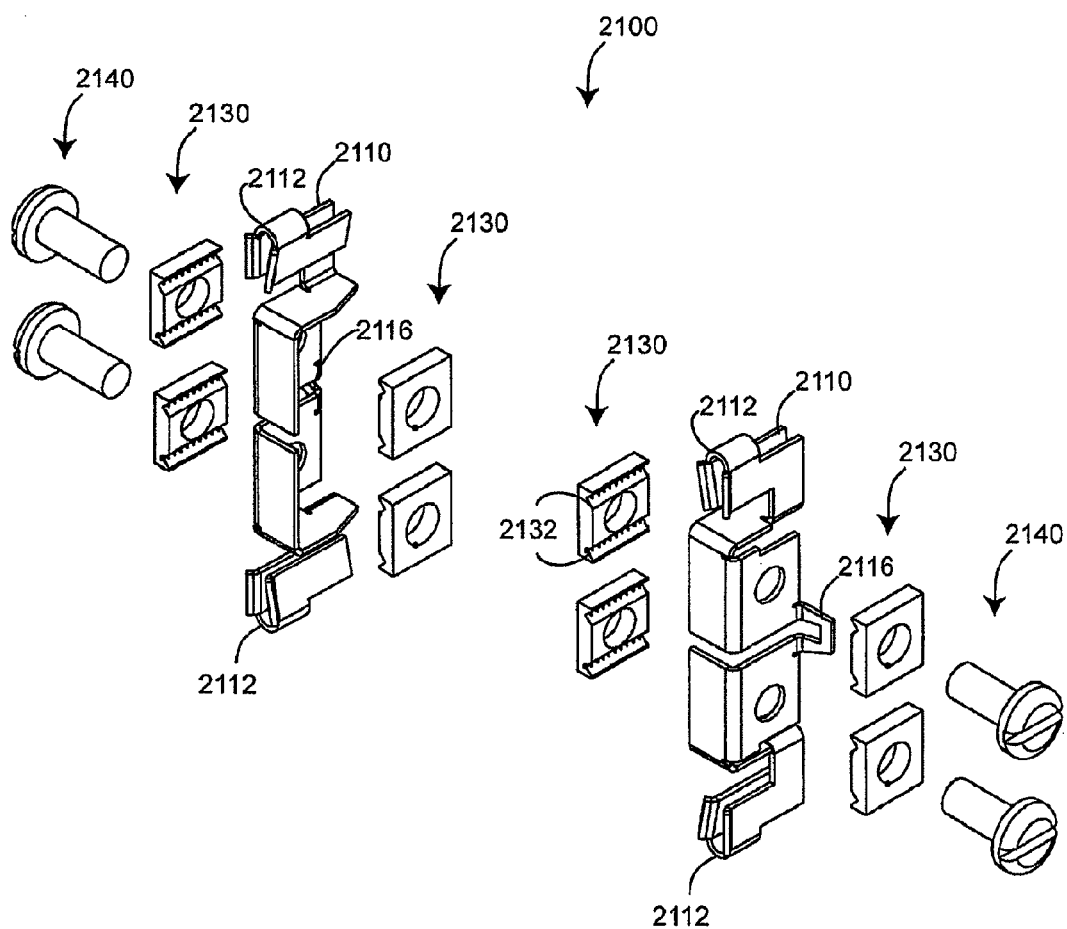

FIGS. 16C-D illustrate a terminal-block wiring module 1600 having terminal guards 1700 that advantageously provide covered access to the terminal set 2100 (FIG. 21). In particular, in a closed position (FIGS. 16A-B) the terminal guards 1700 protect users from shock and insulate between closely mounted high voltage devices. In an open position (FIGS. 16C-D), the terminal guards 1700 allow convenient access to the terminal screws 2140 so as to attach or remove power cable wires from the terminal blocks 1640. As shown in FIG. 16C, a hinge 1702 allows a terminal guard 1700 to move from a closed position (FIGS. 16A-B) to an open position. A latch 1704 presses into a corresponding catch slot 2220, which retains a terminal guard 1700 in a closed position until it is manually opened. As shown in FIG. 16D, in one embodiment a swivel mount 1709 (FIG. 17B) also allows the terminal guard 1700 to swivel from side to side in an open position, further easing access to the terminal screws 2140.

FIGS. 16E-F illustrate orientation-dependent labels on the wiring module functional and wiring sides, respectively. As described above, the type of functional module to be mounted in the wiring module 1600 determines the mounted orientation of the wiring module 1600 within an electrical box. Color coded labels 1620, 1630 on the functional side (FIG. 16E) and wiring labels 1650, 1660 on the wiring side (FIG. 16F) advantageously indicate to the journeyman electrician the correct wiring module 1600 orientation. The color coded labels 1620, 1630 also advantageously indicate the correct functional module to be installed or replaced. In particular, as shown in FIG. 16E, the color coded labels include a switch label 1620 and an outlet label 1630. The switch label 1620 has an orientation indicator 1622 and corresponding text that specify the wiring module orientation for a switch module 900 (FIGS. 2A-B). In addition, color boxes 1624 advantageously match color indicators 2310 (FIG. 23A) on corresponding switch modules 900. Further, as shown in FIG. 16F, the outlet label 1630 has an orientation indicator 1632 and corresponding text that specify the wiring module orientation for an outlet module 300 (FIGS. 1A-B). Also, color boxes 1634 match an outlet color indicator. In one embodiment, the switch color boxes 1624 are yellow, red and orange matching SP, 3-way and 4-way switch color indicators, respectively. The outlet color boxes 1634 are dark and light blue for full hot and half-hot wiring, matching a blue color indicator for an outlet module. The color boxes 1624, 1634 are marked by the journeyman electrician at wiring module installation to visually indicate the module type for which the wiring module 1600 was wired.

As shown in FIG. 16F, there are four terminal blocks 1640, each having terminal labels "1," "2," "3" and "4" 1670 identifying the individual terminal blocks T1, T2, T3 and T4 by number. In a switch orientation (shown), switch labels 1650 are advantageously positioned in a manner visually corresponding to each of the individual terminal blocks 1640. The switch labels 1650 identify switch wiring for each terminal block by switch type SP, 3-way and 4-way. The outlet labels 1660 are upside down in the switch orientation, visually indicating that they are inapplicable. In an outlet orientation (upside down from that shown), outlet labels 1660 are similarly positioned in a manner visually corresponding to each of the individual terminal blocks 1640. The outlet labels 1660 identify outlet wiring. The switch labels 1650 are upside down in the outlet orientation, visually indicating that they are inapplicable.

FIGS. 16G-H illustrate switch and outlet wiring schematics, respectively, corresponding to the terminal labels 1670 (FIG. 16F), switch labels 1650 (FIG. 16F) and outlet labels 1660 (FIG. 16F) described with respect to FIG. 16F, above. Graphically depicted are groups of four terminals 1690 representing the terminal blocks 1640 (FIG. 16F). Also depicted are individual terminal blocks 1691, corresponding hot, neutral, traveler and switch wires 1692, and links and gaps 1693 corresponding to removable breakaways 2116.

Figure 17A:
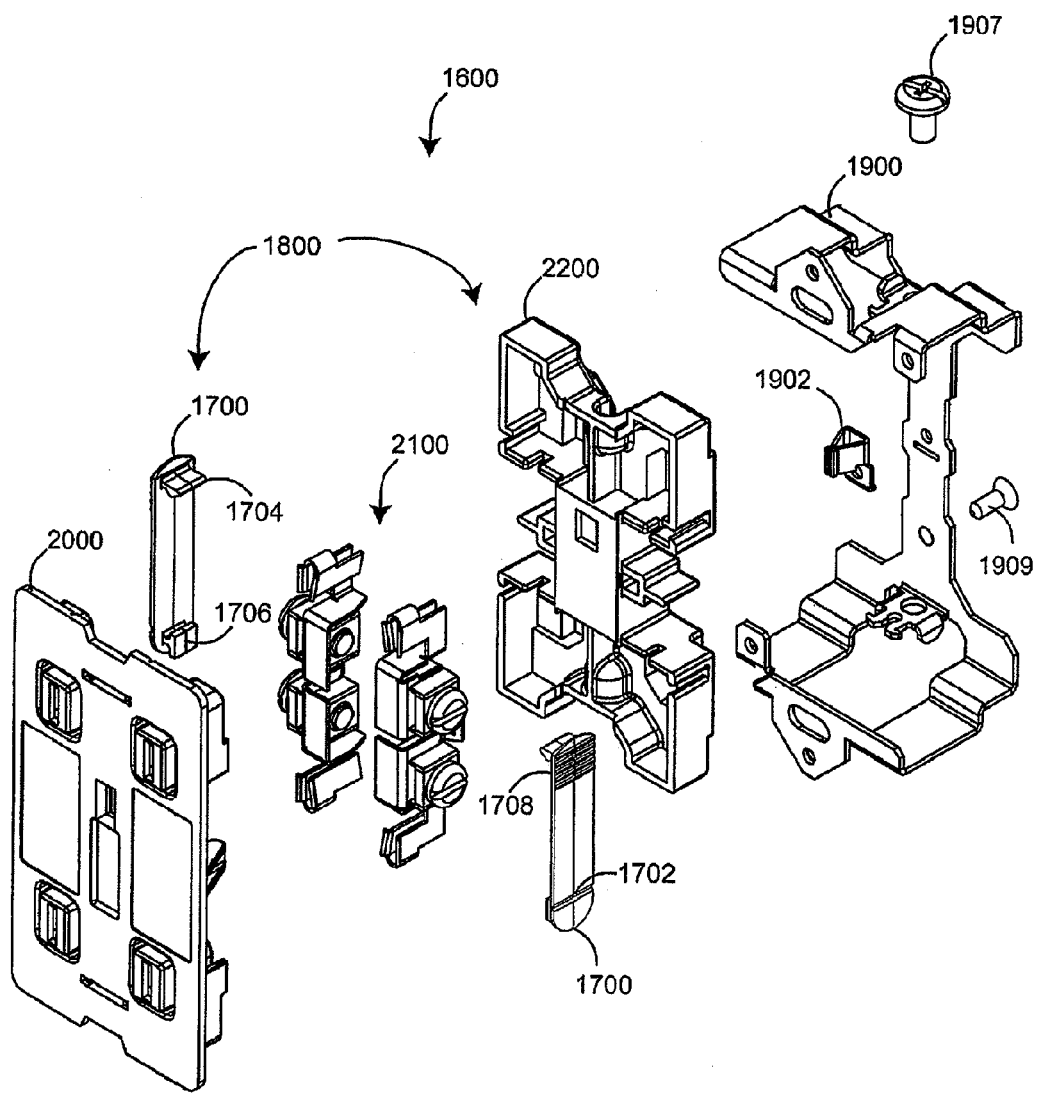
FIG. 17A-B are exploded, front perspective views of a terminal-block wiring module with stationary-mount and swivel-mount terminal guards, respectively.
Figure 17B:
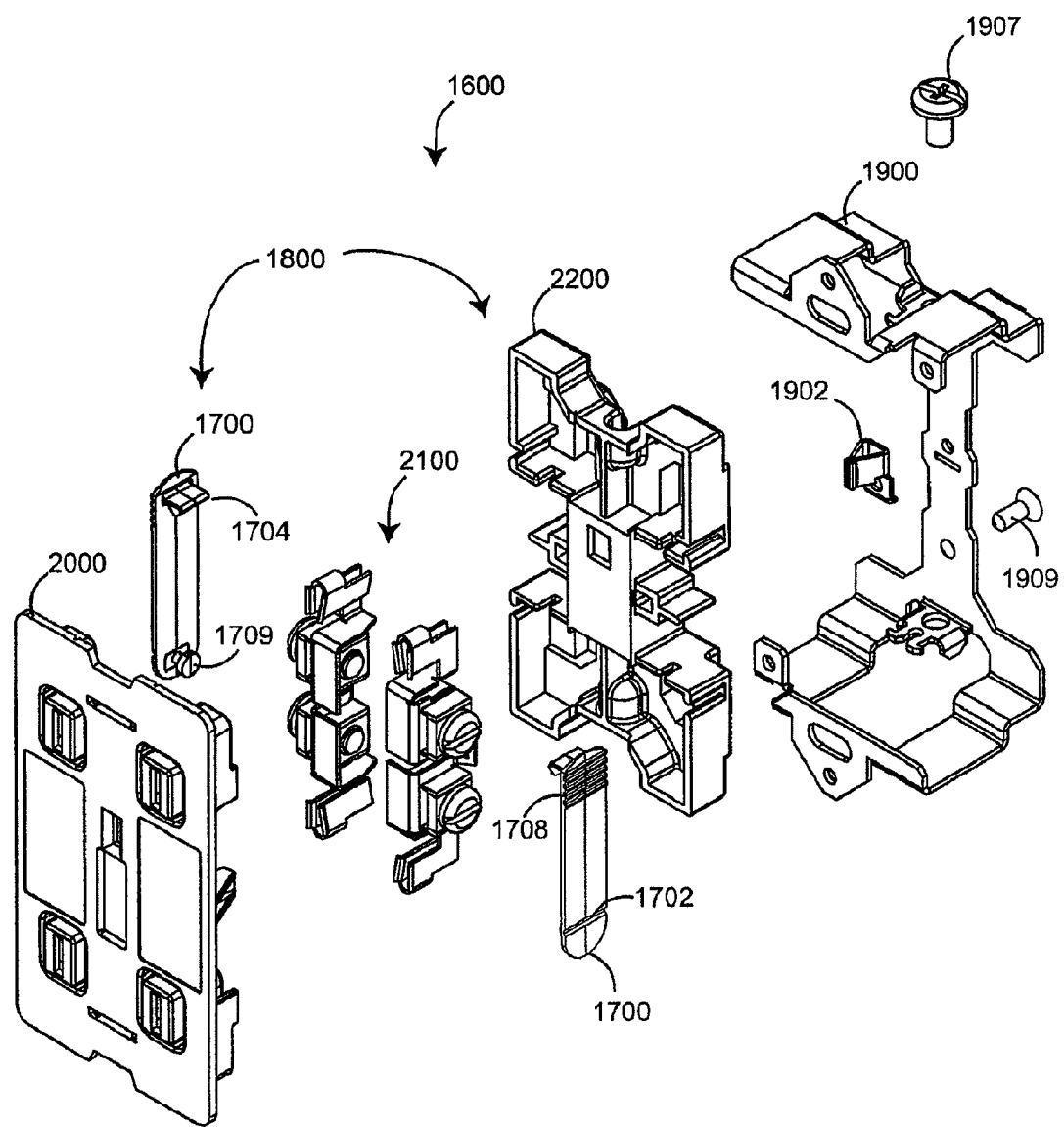
Figure 18A:
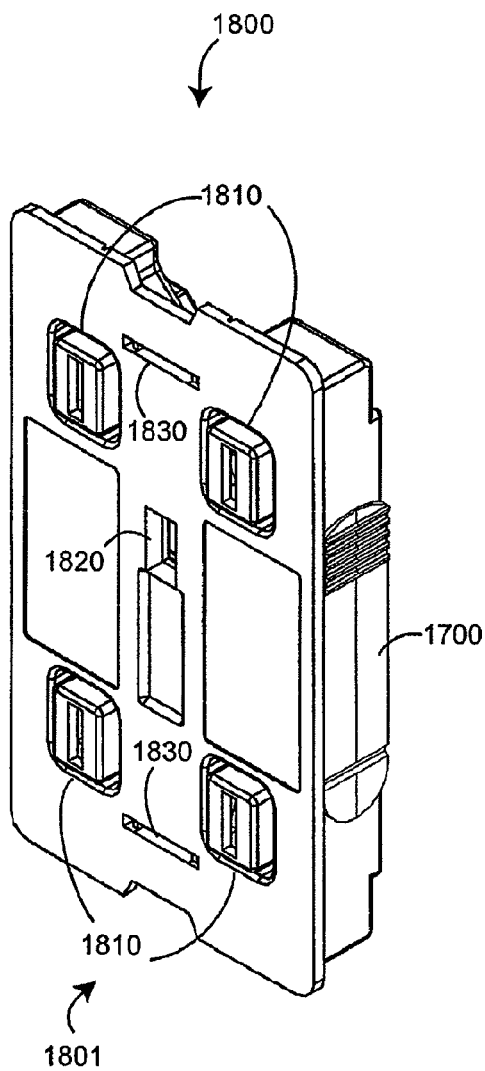
FIGS. 18A-B are front and back perspective views and a back view, respectively, of a wiring panel.

FIGS. 17A-B illustrate a terminal-block wiring module 1600 having a wiring panel 1800 and a mounting bracket 1900. The wiring panel 1800 has a front cover 2000, a back cover 2200, a terminal set 2100 and terminal guards 1700. The front cover 2000 and back cover 2200 are secured together with a fastener (not shown). The mounting bracket 1900 further secures the front cover 2000 to the back cover, as described with respect to FIGS. 18-20, below. The terminal set 2100 is retained within the wiring panel 1800 and provides terminal blocks 1640 (FIG. 16F) for power cable attachment and provides conductive paths between the terminal blocks 1640 (FIG. 16F) and structured sockets 1810 (FIG. 18A). The mounting bracket 1900 advantageously performs multiple functions including securing the wiring module 1600 to an electrical box (not shown), securing together the front and back covers 2000, 2200, providing a ground bar clip 1902 (FIG. 19A) for contact with a module ground bar 834 (FIG. 3B) and providing a ground terminal 1907 (FIG. 19A) for a ground wire connection.

As shown in FIGS. 17A-B, the terminal guards 1700 each have a hinge 1702, a latch 1704, a mount 1706, 1709 and a grip 1708. The mount 1706, 1709 slides into a corresponding guard slot 2210 (FIG. 22A) on each side of the back cover 2200, which secures each terminal guard 1700 to the wiring panel 1800. The hinge 1702 advantageously allows a terminal guard 1700 to move between a closed position (FIGS. 16A-B) blocking inadvertent contact with the terminal blocks 1640 (FIG. 16F) and an open position (FIGS. 16C-D) allowing access to the terminal blocks 1640 (FIG. 16F). The latch 1704 presses into a corresponding catch slot 2220 (FIG. 22A) on each side of the back cover 2200, which retains each terminal guard 1700 in a closed position until it is manually opened. A grip 1708 assists in latching the terminal guards 1700. A stationary mount 1706 (FIG. 17A) holds the terminal guards 1700 in alignment with the terminal screws 2140 (FIG. 21). Alternatively, a swivel mount 1709 (FIG. 17B) advantageously allows the terminal guards 1700 to swivel to either side 1601, 1602 (FIGS. 16A-B) of the wiring module for easier access to the terminal screws 2140 (FIG. 21).

Figure 18B:
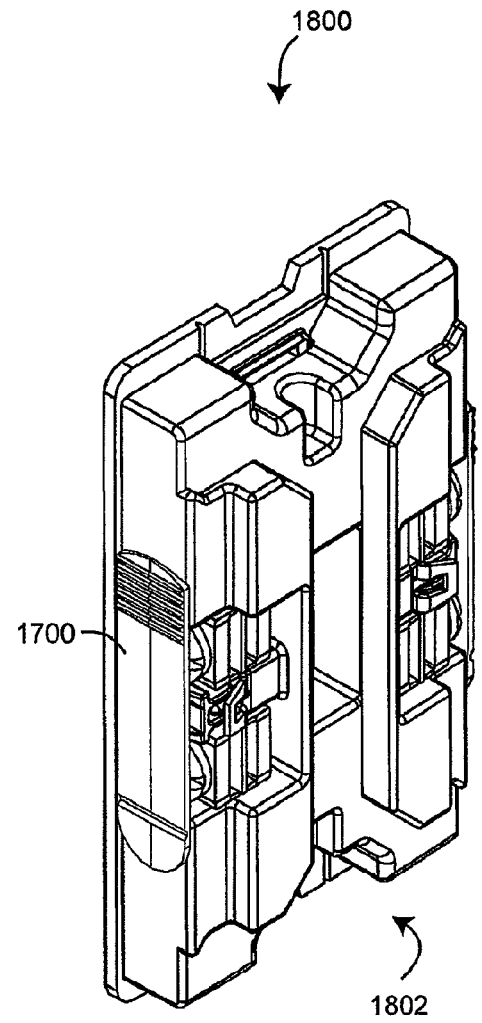

FIGS. 18A-B illustrate a wiring panel 1800 having a front side 1801 and a back side 1802. The front side 1801 has structured sockets 1810, a ground socket 1820 and bracket slots 1830. The back side 1802 has terminal blocks 1640 (FIG. 16F) formed by a terminal set 2100 (FIG. 21) having terminal screws 2140 (FIG. 21) that are accessed through the terminal guards 1700, as described above.

Figure 19A:
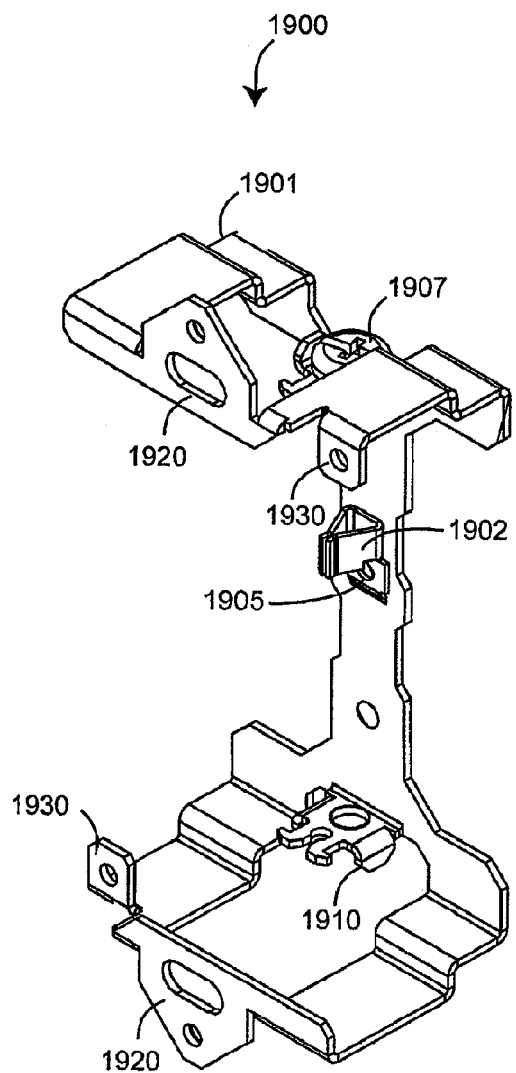
FIGS. 19A-B are front and back perspective views, respectively, of a mounting bracket.
Figure 19B:
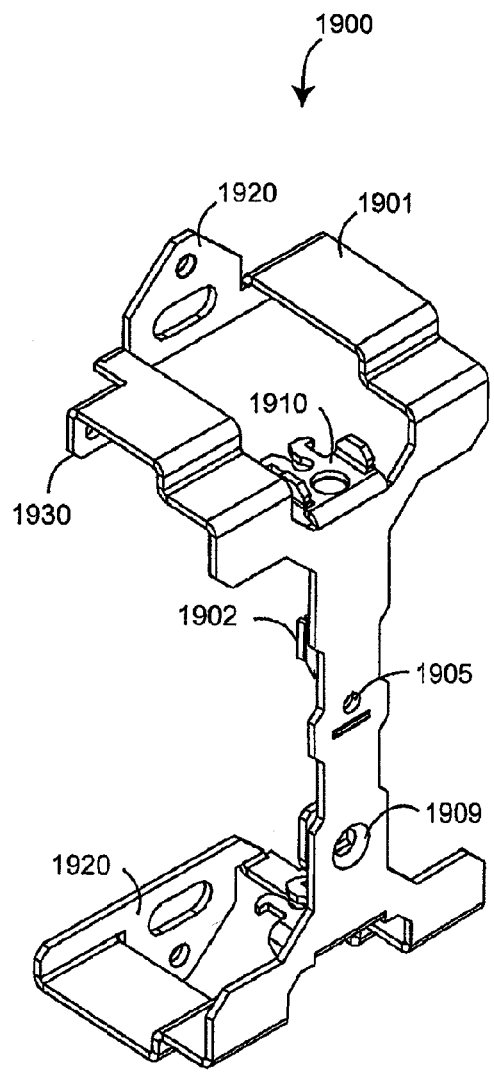

FIGS. 19A-B illustrate a mounting bracket 1900 having a bracket body 1901, a ground clip 1902 and a ground terminal 1907. The ground clip 1902 is attached to the bracket body 1901 with a rivet 1905. The ground terminal 1907 provides a ground termination for a ground wire (not shown). The bracket 1900 has swages 1910, box mounts 1920 and module mounts 1930. The bracket 1900 is configured to be disposed around the rear cover 2200 (FIGS. 22A-B) with the swages 1910 inserted through front cover slots 2020 (FIGS. 20A-B) and spread against the front cover outside 2001 so as to secure together the front and rear covers 2000, 2200. A fastener 1909 is inserted through the bracket and into the wiring panel front cover 2000, so as to secure together the front and rear covers 2000, 2200. The box mounts 1920 allow the wiring module 1600 (FIGS. 16A-B) to be secured to an electrical box (not shown) and are configured to removably engage a box cover (FIGS. 27-29). The module mounts 1930 allow functional modules 300 (FIGS. 3A-B), 900 (FIGS. 9A B) to be secured to the wiring module 1600 (FIGS. 16A-B). The ground clip 1902 is configured to physically and electrically connect to a module ground bar 834 (FIGS. 8A-B).

Figure 27A:
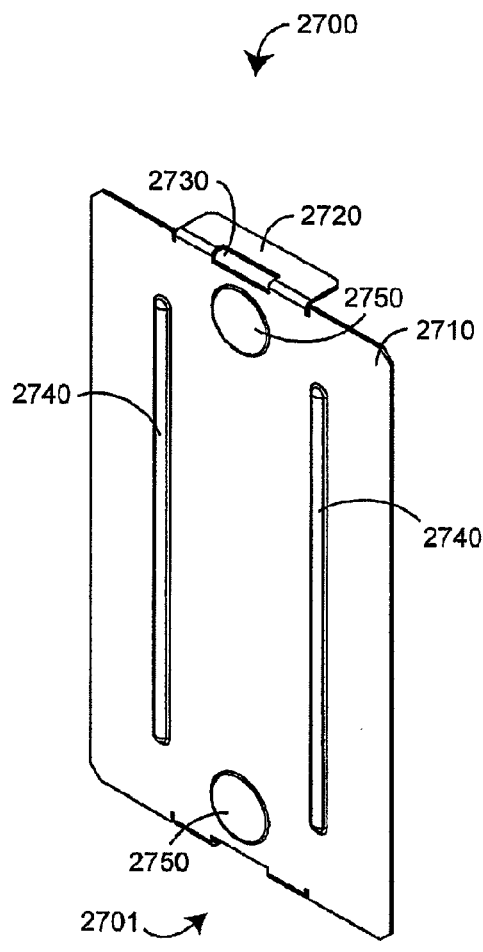
FIGS. 27A-B are front and back perspective views, respectively, of an electrical box cover.
Figure 27B:
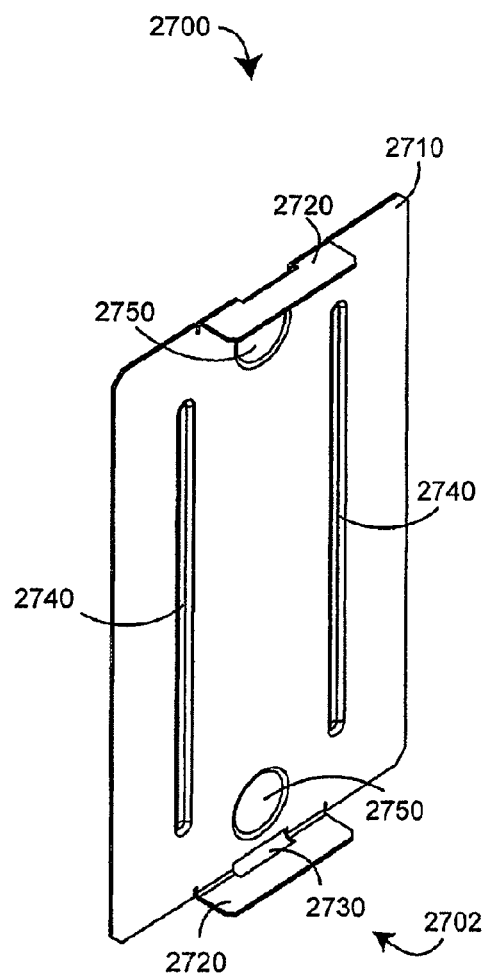

In an alternative embodiment, the mounting bracket 1900 does not have swages 1910. Multiple fasteners 1909 are inserted through the mounting bracket 1900 and into the wiring panel front cover 2000, so as to secure together the front and rear covers 2000, 2200. After the mounting bracket 1900 is attached to the front cover 2000, ears at the top and bottom of the mounting bracket 1900 are bent over and against the front cover outside 2001 to further secure together the front and rear covers 2000, 2200. Trusses are included across or proximate to folded portions of the mounting bracket 1900 to strengthen the bracket structure. The box mount 1920 may have an alternative shape so as to accommodate a box cover 2700 (FIGS. 27A-B).

Figure 20A:
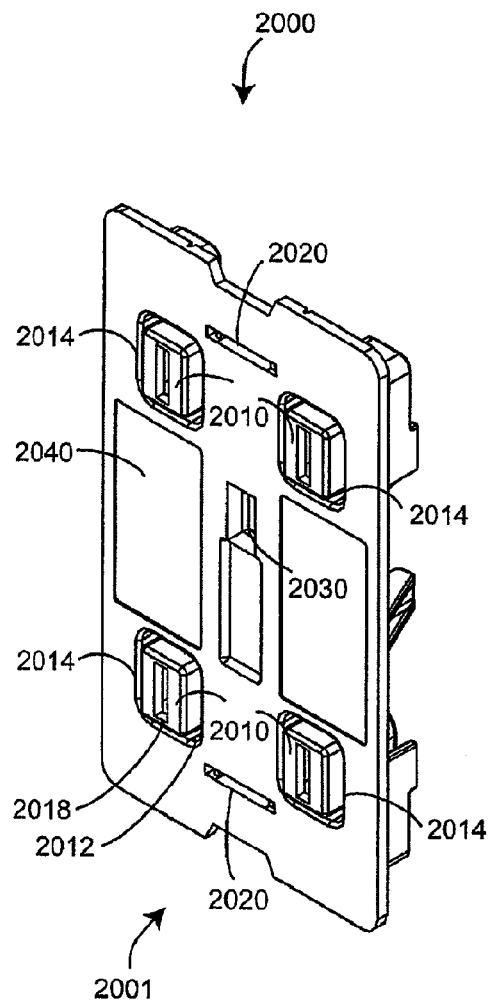
FIGS. 20A-B are front and back perspective views, respectively, of a wiring panel front cover.
Figure 20B:
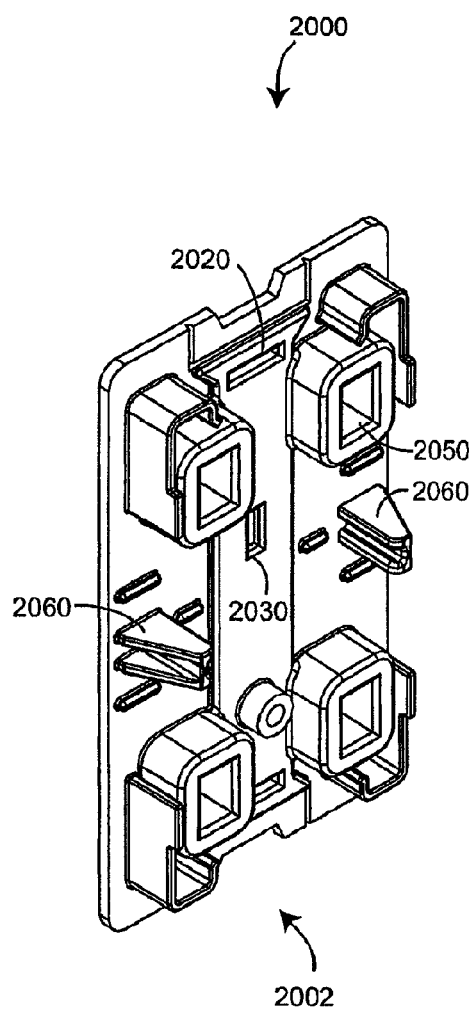

FIGS. 20A-B illustrate a front cover 2000 having an outside face 2001 and an inside face 2002. As shown in FIG. 20A on the outside face 2001, raised guards 2010 and surrounding channels 2014 provide the nonconductive portions of structured sockets 1810 (FIG. 18A). Each raised guard 2010 and surrounding channel 2014 are configured to mate with a corresponding plug shield 610 (FIG. 6B). In particular, when a functional module is plugged into the wiring module 1600 (FIGS. 16A-B), shields 610 (FIG. 6B), 1510 (FIG. 15B) insert into channels 2014, guards 2010 insert within shields 610 (FIG. 6B), 1510 (FIG. 15B), and prongs 702 (FIGS. 7A-B) plug into power clips 2112 (FIG. 21). This interlocking action of the shield plugs 330 (FIG. 3B), 930 (FIG. 9B) and the structured sockets 1810 (FIG. 18A) advantageously provides a fully enclosed shield as an electrical connection is made between a functional module and a wiring module, in addition to tactile feedback and a solid mechanical and electrical connection. Further, the guards 2010 and channels 2014 reduce the chance of an inadvertent contact between a tool, such as a screwdriver tip, and a hot contact within a socket 1810 (FIG. 18A). For example, a tool dragged across the wiring panel front side 1801 (FIG. 18A) during service will tend to lodge in the channel 2014 or against the raised guard 2010 or both. In a particular embodiment, the shields 610 (FIG. 6B), 1510 (FIG. 15B) and the corresponding channels 2014 and raised guards 2010 are generally rectangular in shape with rounded corners.

As shown in FIG. 20B, the inside face 2002 has swage slots 2020, a ground aperture 2030 and terminal support structure 2050, 2060. The swage slots 2020 accommodate the mounting bracket swages 1910 (FIG. 19A), which assist to secure together the front and back covers 2000, 2200. The ground aperture 2030 accommodates a ground bar 834 (FIG. 3B) or key bar 1520 (FIG. 9B) as part of a ground socket 1820 (FIG. 18A). The support structure 2050, 2060 houses the terminal set 2100 (FIG. 21).

FIG. 21 illustrates a terminal set 2100 having contact busses 2110, terminal clamps 2130 and terminal screws 2140. The contact busses 2110 each have power clips 2112 that provide the conductor portion of the structured sockets 1810 (FIG. 18A). The power clips 2112 are configured to physically and electrically connect with module prongs 702 (FIGS. 7A-B), 1312, 1322 (FIGS. 13A-B). The terminal clamps 2130 and terminal screws 2140 terminate power cables (not shown) to the contact busses 2110. The terminal clamps 2130 are configured to secure one wire per channel 2132. Advantageously, this provides a four-wire capacity for each of four terminal blocks 1640 (FIG. 16F). In one embodiment, each terminal block 1640 (FIG. 16F) is configured for four 14 gauge copper wires or two 12 gauge copper wires. Breakaways 2116 are removable to selectively isolate individual terminal blocks 1640 (FIG. 16F).

Figure 22A:
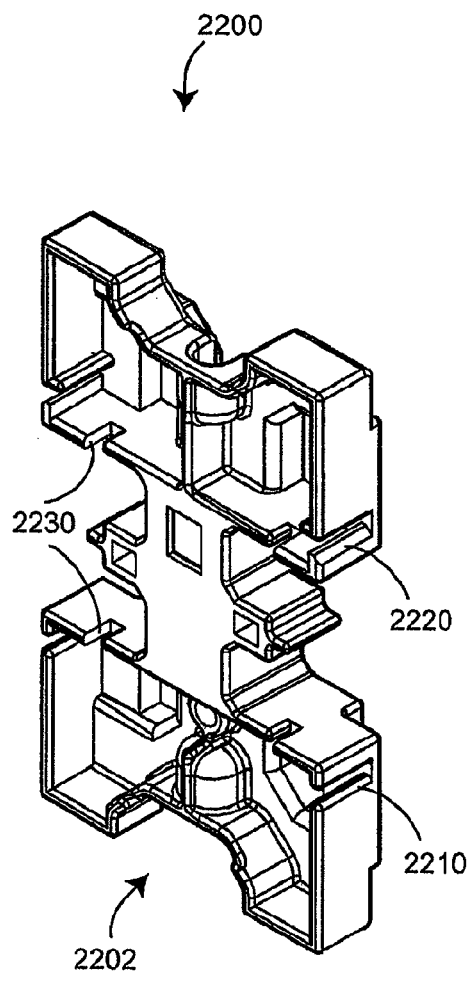
FIGS. 22A-B are front and back perspective views, respectively, of a wiring panel back cover.
Figure 22B:
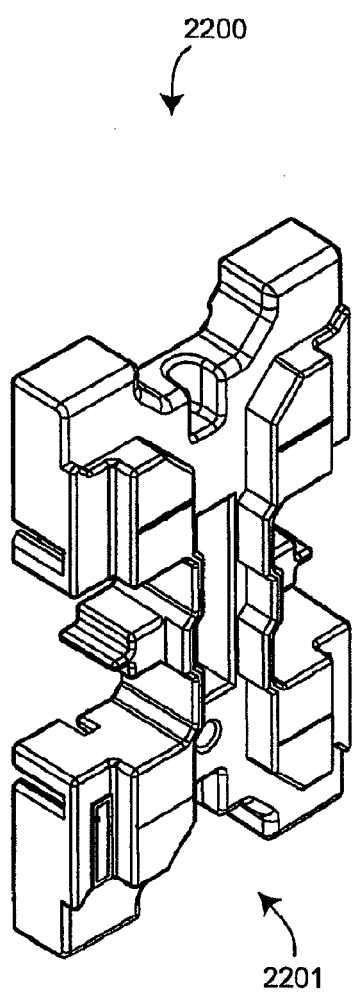

FIGS. 22A-B illustrate a back cover 2200 having an inside face 2202 and an outside face 2201. The inside face 2202 has mount slots 2210 and catch slots 2220 that retain the terminal guards 1700 (FIG. 17), as described above. The inside face 2202 also has terminal slots 2230 that retain the terminal set. The outside face 2201 is shaped to accommodate the mounting bracket 1900 (FIGS. 19A-B) and accommodate power cable attachment to the terminal blocks 1640 (FIG. 16F).

Dimmer Switch Module

Figure 24:
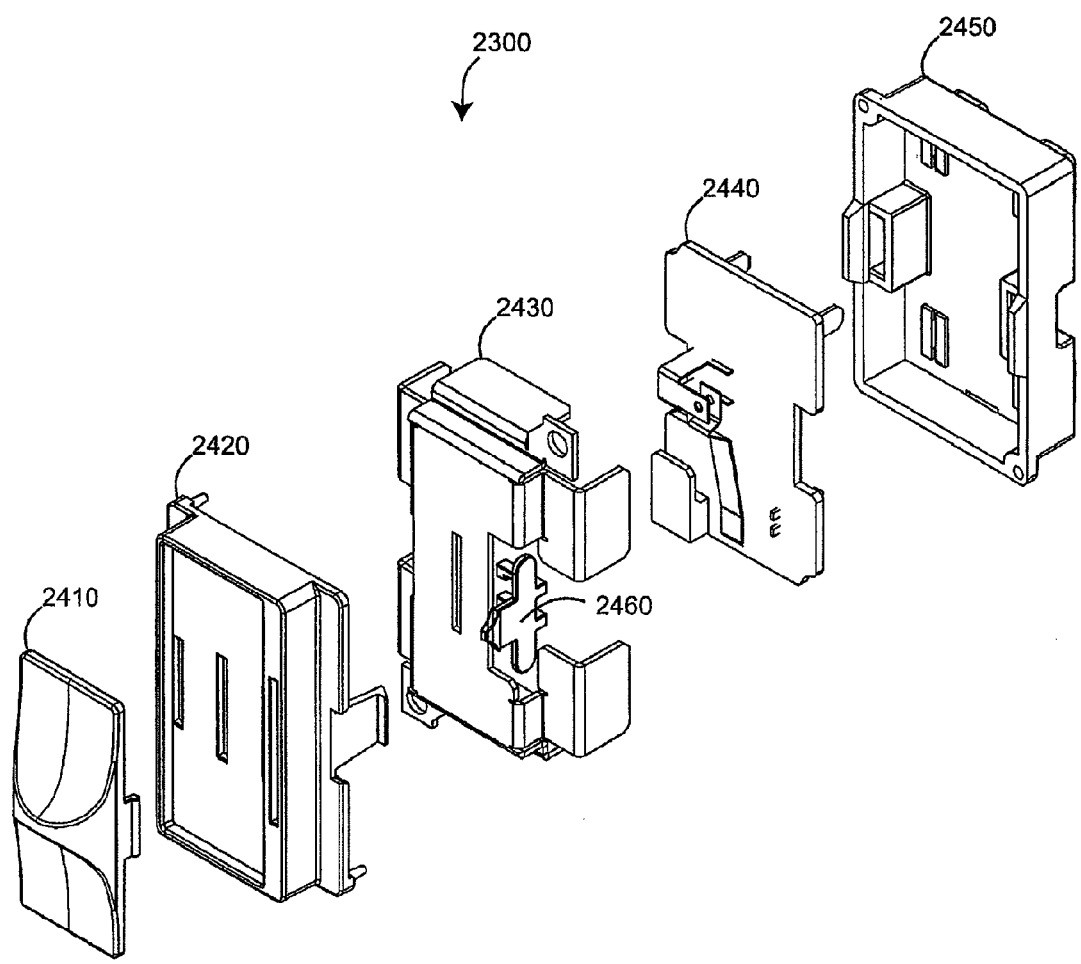
FIG. 24 is an exploded, front perspective view of a dimmer switch module.

FIGS. 23A-B illustrate a dimmer switch module 2300 having a switch 2410 and a dimmer lever 2460 on a front side 2301 and shielded plugs 2330 and a key bar 2350 on a back side 2302. The top of the switch module 2300 also has a color label 2310. The color label 2310 corresponds in color to one of the wiring module color labels 1624. In this manner, the switch module color label 2310 advantageously provides a visual indication of proper module orientation and avoids installation into a wiring module 1600 (FIG. 16E F) wired for a different module type. Similar color labels of differing colors may be applied in a similar fashion to outlet modules 300 (FIGS. 3A-B) and other switch modules 900 (FIGS. 9A-B) for the same purpose. FIG. 24 illustrates the dimmer switch module 2300 including a switch 2410, a front cover 2420, a bracket 2430, a circuit board 2440, a back cover 2450 and a dimmer lever 2460.

Fixed-Wire Wiring Module

Figure 25A:
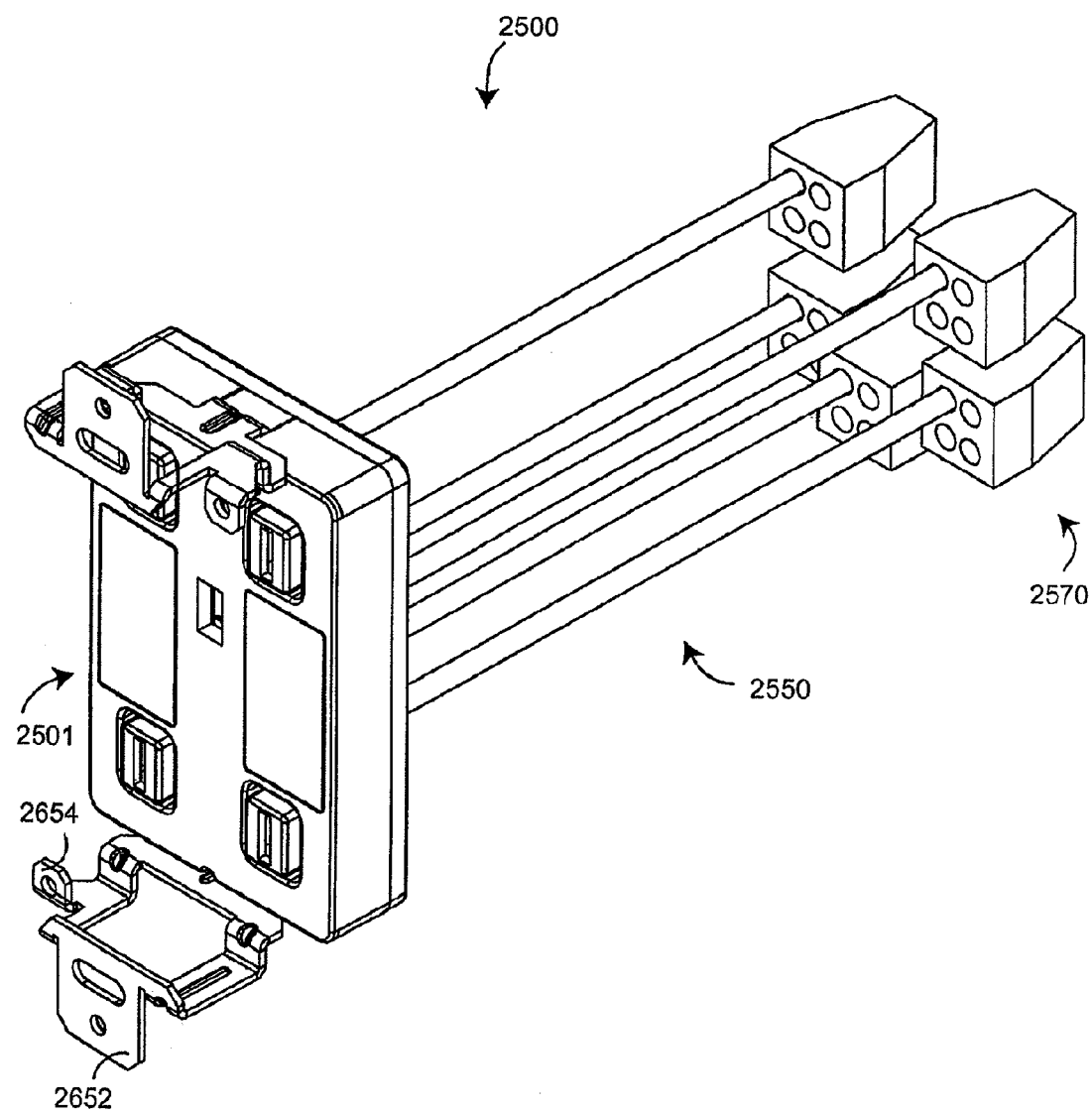
FIGS. 25A-B are front and back perspective views, respectively, of a fixed-wire wiring module.
Figure 25B:
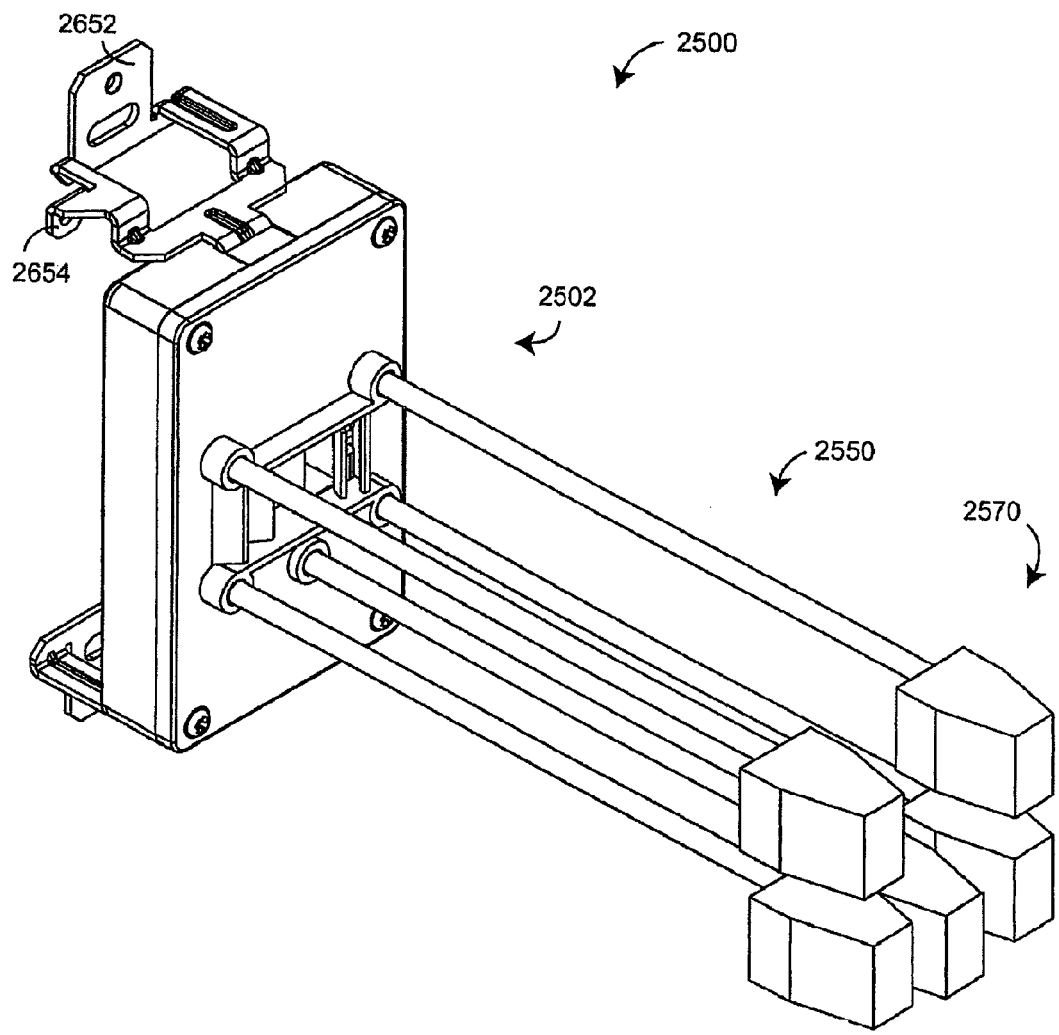

FIGS. 25A-B illustrate a fixed-wire wiring module 2500 having a functional side 2501 and a wiring side 2502. The wiring module 2500 is configured to mount within a conventional electrical box (not shown), secured with attachment screws (not shown) threaded through box mounts 2652. A functional module, such as an outlet module 300 (FIGS. 3A-B) or a switch module 900 (FIGS. 9A-B) plug into the wiring module functional side 2501, secured to the wiring module 2500 with attachment screws (not shown) that thread through attachment ears (not shown) and corresponding module mounts 2654, as described with respect to FIGS. 1-2, above. A power cable (not shown) routed to the electrical box attaches to pushwire connectors 2570 at the end of fixed wires 2550 extending from the wiring module wiring side 2502.

Figure 26A:
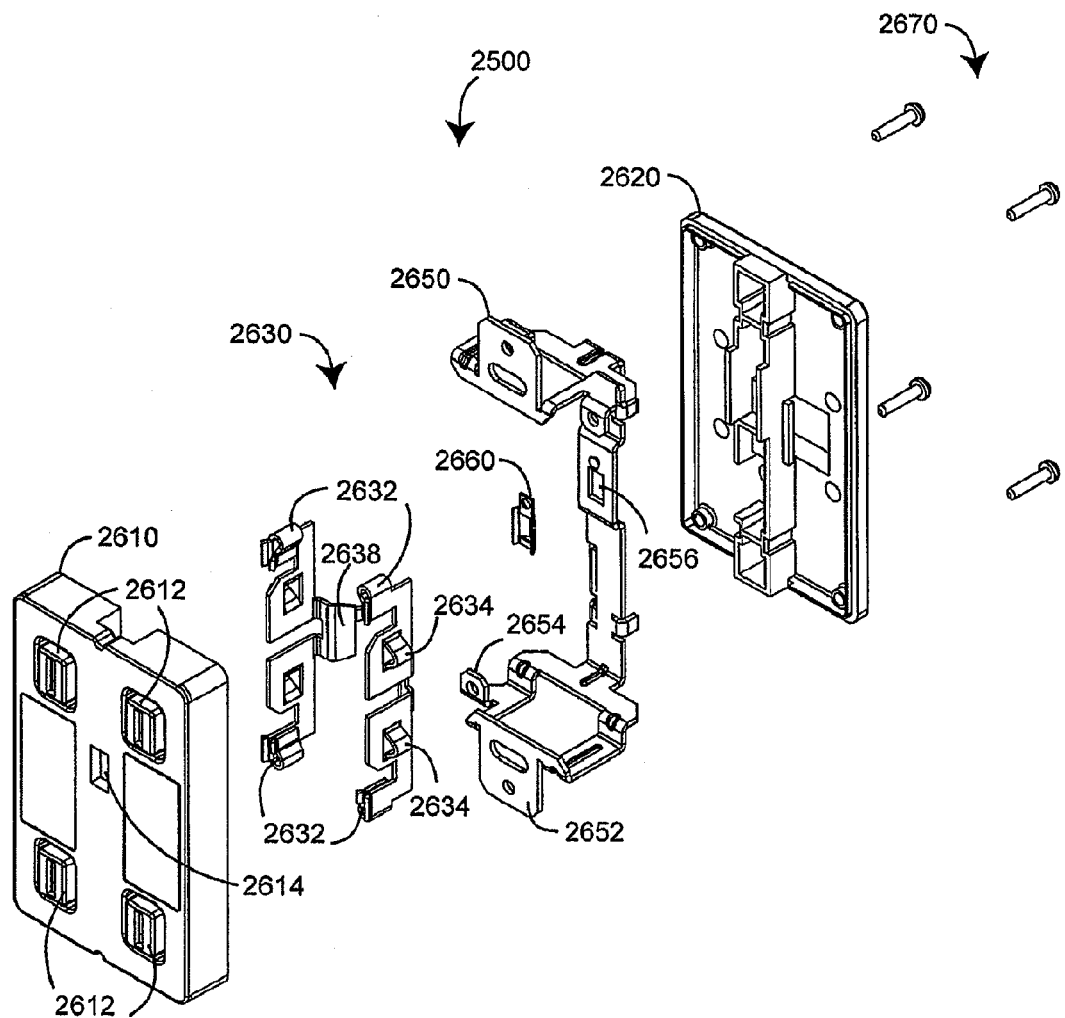
FIGS. 26A-B are exploded, front and back perspective views, respectively, of a fixed-wire wiring module.
Figure 26B:
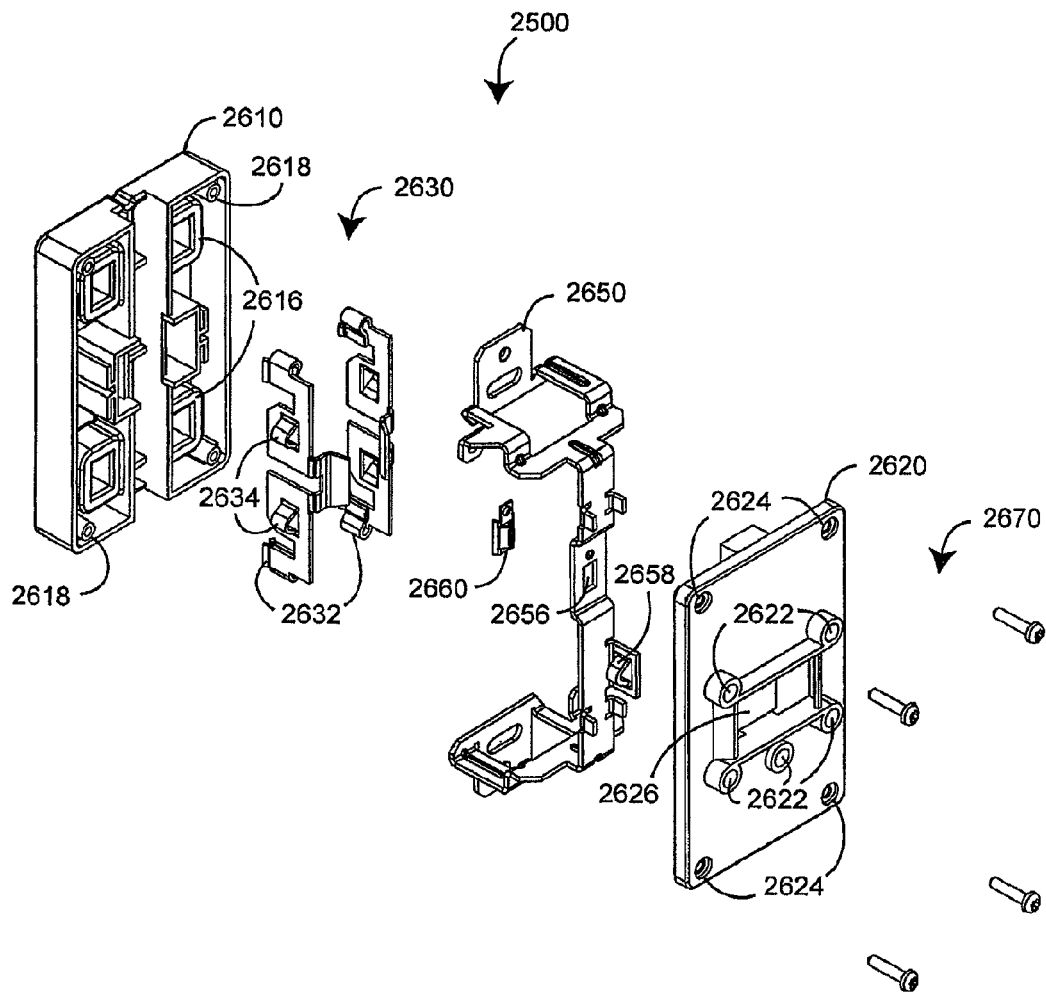

FIGS. 26A-B illustrate a fixed-wire wiring module 2500 having a front cover 2610, a back cover 2620, a terminal set 2630, a mounting bracket 2650, a ground bar clip 2660 and fasteners 2670. The front cover 2610 and back cover 2620 are secured together with the fasteners 2670 and enclose the terminal set 2632. Advantageously, the mounting bracket 2650 is partially enclosed by, and retained between, the front cover 2610 and back cover 2620 so as to secure the mounting bracket 2650 to, and mechanically and electrically integrate the mounting bracket with, the wiring module 2500.

As shown in FIGS. 26A-B the front cover 2610 has structured sockets 2612, a ground aperture 2614, support structure 2616 and fastener posts 2618. The structured sockets 2612 interlock with functional module shielded plugs and the ground aperture 2614 accommodates a ground bar or key bar as part of a ground socket in a manner as described with respect to FIGS. 20A-B, above. The support structure 2616 houses the terminal set 2630. The fastener posts 2618 align with fastener apertures 2624 and accept the fasteners 2670 securing the front cover 2610 to the back cover 2620.

Also shown in FIGS. 26A-B, the terminal set 2630 has power clips 2632, fixed wire terminals 2634 and breakaways 2638. The power clips 2632 provide the conductor portion of the structured sockets 2612 and are configured to physically and electrically connect with module prongs in a manner as described with respect to FIG. 21, above. The fixed wire terminals 2634 electrically and mechanically connect a striped end of the fixed wires 2550 (FIGS. 25A-B) to the terminal set 2630. The breakaways 2638 are removable to selectively isolate individual power clips 2632.

Further shown in FIGS. 26A-B, the mounting bracket 2650 is adapted to a channel extending lengthwise along the front cover 2610 and corresponding support structure extending lengthwise along the back cover 2620. The mounting bracket 2650 has box mounts 2652, module mounts 2654, a ground clip aperture 2656 and a ground terminal 2658. The box mounts 2652 accept fasteners (not shown) to secure the bracket to an electrical box (not shown). The module mounts 2654 accept fasteners (not shown) to secure a functional module (not shown) to the wiring module 2500. The ground clip aperture 2656 is adapted to the ground clip 2660, which connects a functional module ground bar electrically and mechanically to the bracket 2650. The bracket has an integrated rivet for securing the ground clip 2660 within the aperture 2656. The ground terminal 2658 electrically and mechanically connects a striped end of a ground one of the fixed wires 2550 (FIGS. 25A-B) to the bracket 2650.

Additionally shown in FIGS. 26A-B, the back cover 2620 has wire apertures 2622, fastener apertures 2624 and a breakaway aperture 2626. The wire apertures 2622 are adapted to the fixed wires 2550 (FIGS. 25A-B) so as to provide a seal around and strain relief for the fixed wires and access to the terminal set 2630 and ground terminal 2658. The fastener apertures 2624 accept that portion of the fasteners 2670 that thread into or are otherwise secured to the fastener posts 2618. The breakaway aperture 2626 allows user access to the breakaways 2638 within an assembled wiring module 2500.

Electrical Box Cover

FIGS. 27A-B illustrate an electrical box cover 2700 having a generally planar cover plate 2710, clamps 2720, catches 2730, trusses 2740 and markers 2750. The cover plate 2710 has a front side 2701 and a back side 2702. The clamps 2720 are located, one each, generally centered on the top and bottom of the cover plate 2710 and extend generally perpendicularly from the back side 2702. The catches 2730 are apertures, one for each catch 2730, that are generally centered on the catches 2720 and extending along the juncture between the catches 2730 and the cover plate 2710. The trusses 2740 are protrusions on the cover plate 2740 that extend substantially along the length of the front side 2701, providing structural support to resist bending of the cover plate 2710. The markers 2750 are generally round protrusions on the front side 2701 of the cover plate 2740 located, one each, proximate the top and bottom of the cover plate 2740.

Figures 28A, 28B:
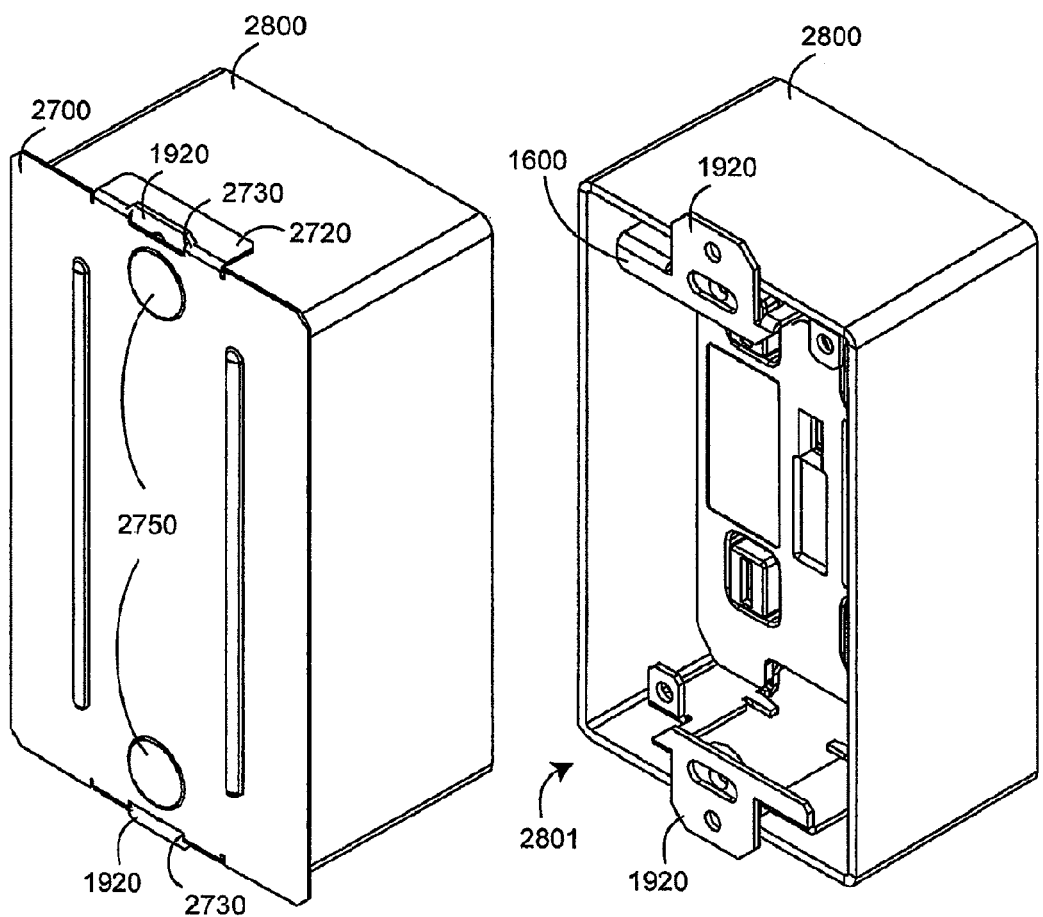
FIGS. 28A-B are front perspective views of a covered and uncovered electrical box, respectively.
Figure 29:
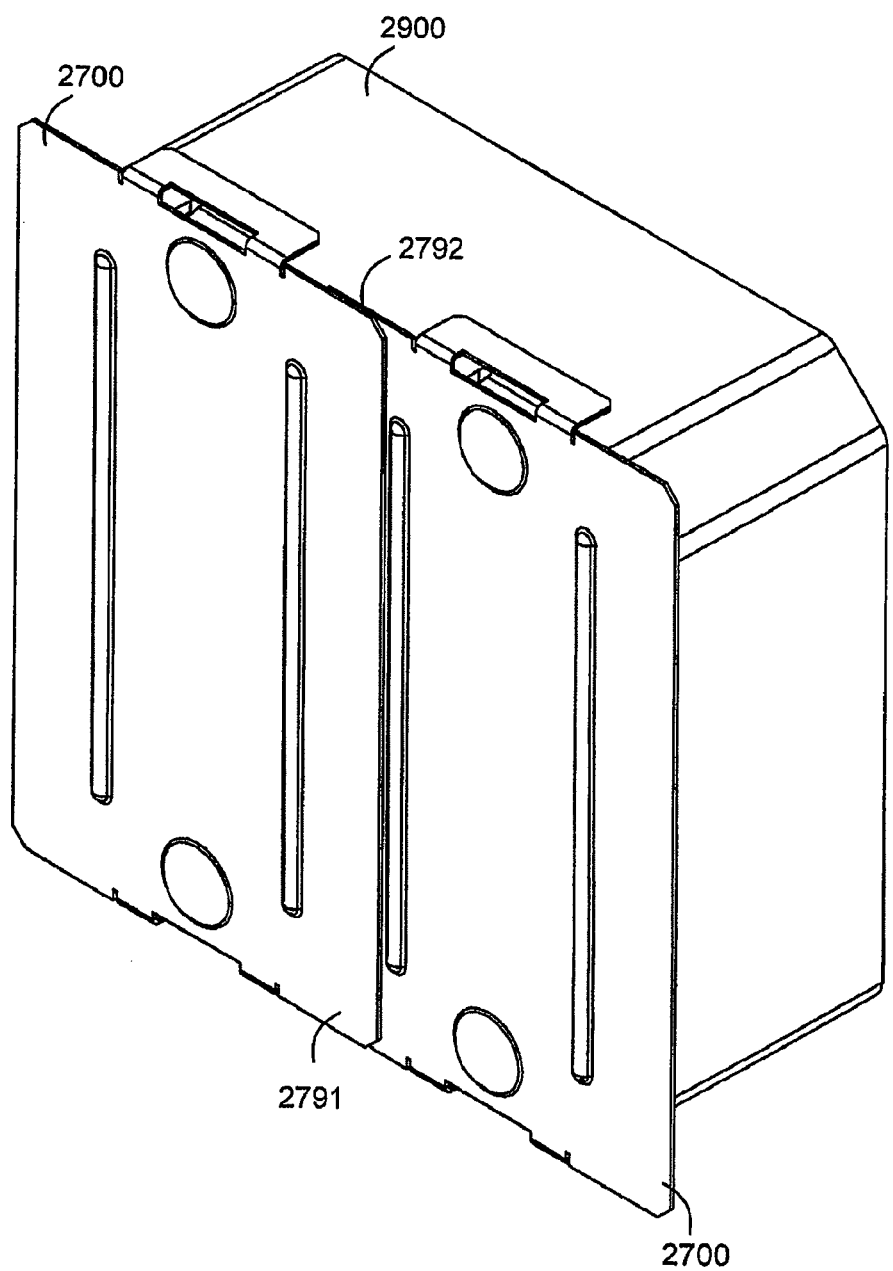
FIG. 29 is a front perspective view of a 2-gang electrical box with overlapping covers.

FIGS. 28A-B illustrate an electrical box 2800 that is covered and uncovered, respectively, by a box cover 2700, as described with respect to FIGS. 27A-B, above. The box cover 2700 removably mounts over the electrical box open face 2801 so as to prevent material such as plaster and paint from fouling the wiring module 1600 during the makeup phase of construction. Advantageously, the box cover 2700 mounts generally flush with the electrical box open face 2801 and, hence, generally flush with installed drywall so as not to interfere with drywall construction during the makeup phase. Drywall, once loosely positioned, can be pressed against the box cover 2700. In doing so, the markers 2750 dimple the drywall, advantageously marking the location of the electrical box 2800 so that drywall cutouts can be accurately made to accommodate the electrical box 2800.

As shown in FIGS. 28A-B, the box cover 2700 is installed on the box mounts 1920 of a wiring module 1600 mounted within the electrical box 2800. In particular, the clamps 2720 flex somewhat to slide over the box mounts 1920 until the box mounts 1920 insert into corresponding catches 2730. The box cover 2700 can be easily removed by flexing the clamps 2720 so that a box mount 1920 clears a corresponding catch 2730.

FIG. 29 illustrate a 2-gang electrical box 2900 with overlapping box covers 2700. The box covers 2700 are configured so that a first portion 2791 of one cover overlaps a second portion 2792 of another cover so as to prevent drywall related material from entering between the covers 2700 and fouling the electrical box 2900 interior.

Terminal Shield

Figure 30A:
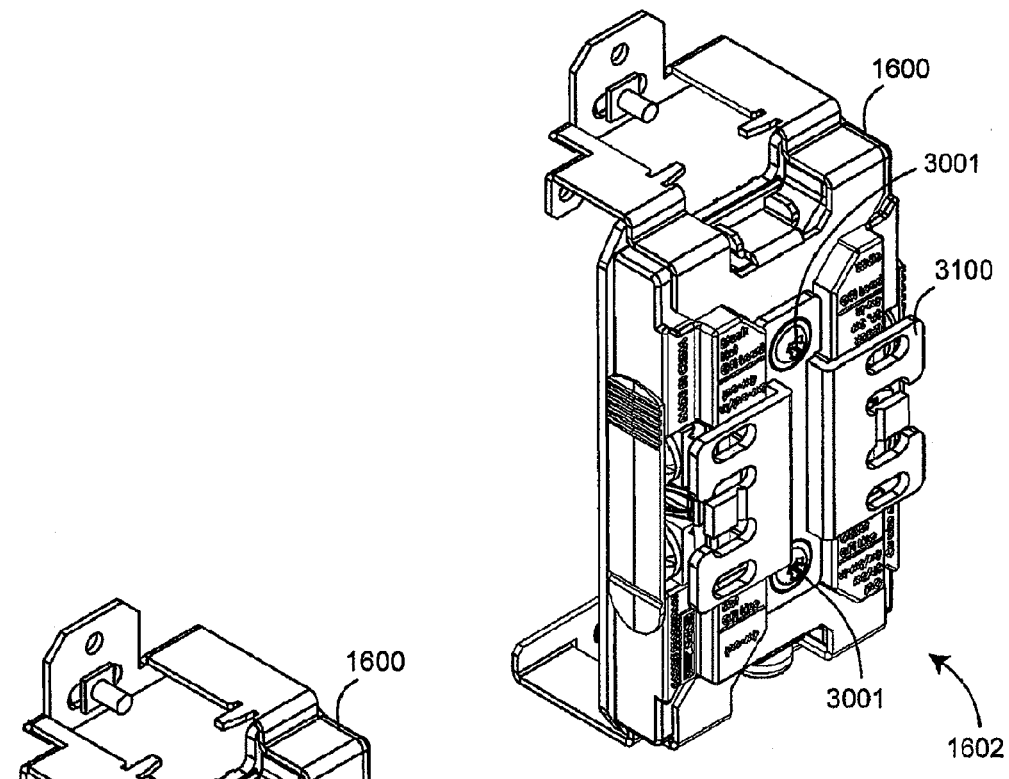
FIGS. 30A-B are back perspective and back perspective exploded views, respectively, of a wiring module having a terminal shield.
Figure 30B:
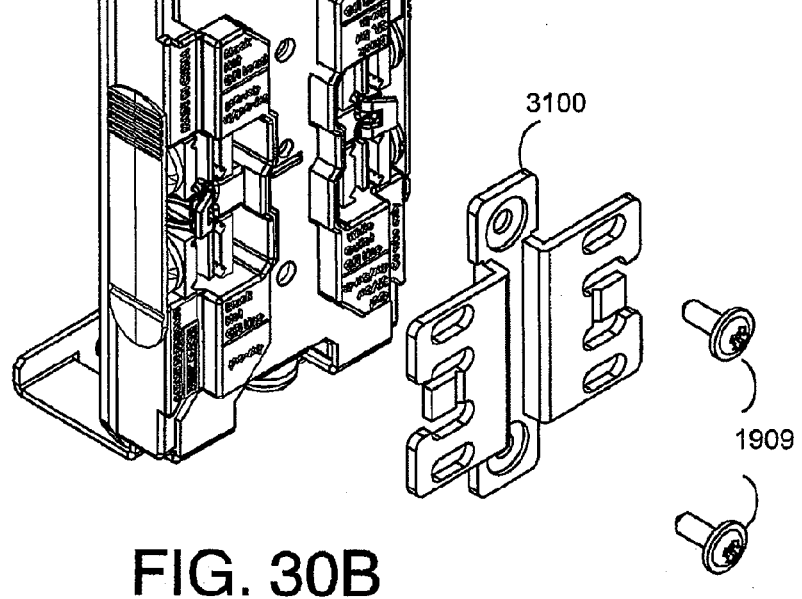

FIGS. 30A-B illustrate a terminal-block wiring module 1600 having a terminal shield 3100 installed on a wiring side 1602 using fasteners 1909. The terminal shield 3100 advantageously prevents bare copper ground wires (not shown), which typically are connected between the ground terminal 1907 (FIG. 17A) and an electrical box (not shown), from inadvertently protruding through the back cover 2200 (FIG. 17A) and short circuiting the terminal set 2100 (FIG. 17A).

Figure 31A:
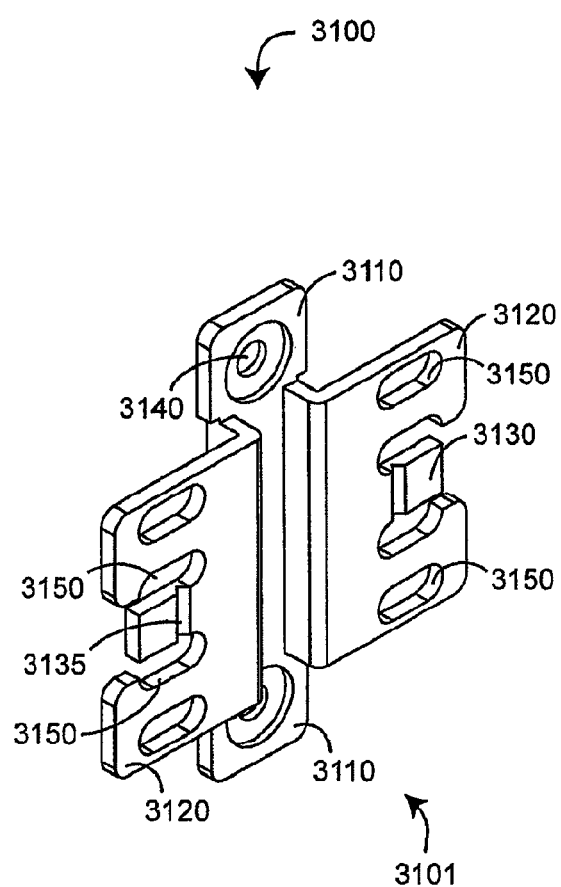
FIGS. 31A-B are front and back perspective views, respectively, of a terminal shield.
Figure 31B:
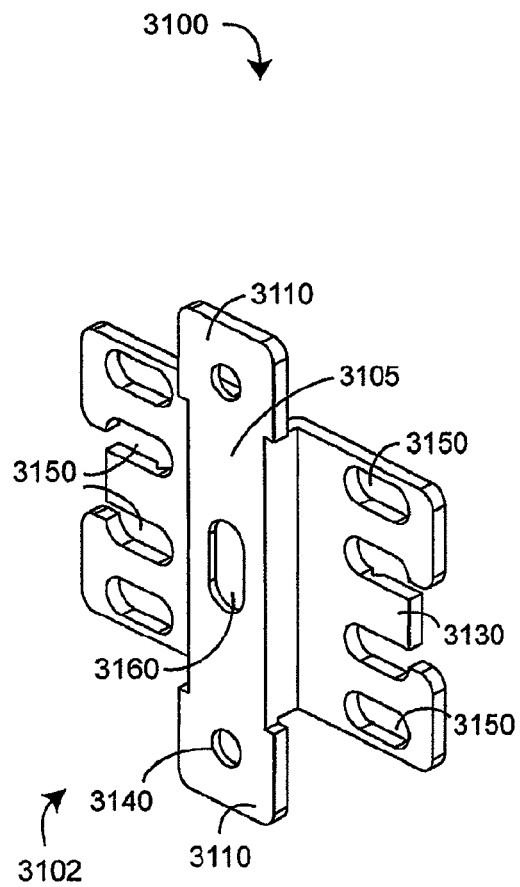

FIGS. 31A-B illustrate a terminal shield 3100 having a front side 3101, a back side 3102 and a spine 3105. Mounting ears 3110 extend from both ends of the spine 3105, and shield wings 3120 extend from both sides of the spine 3105. Breakaway guards 3130 extend from a central portion of each shield wing 3120. A V-shaped hinge 3135 extending across a portion of each breakaway guard 3130 allows the breakaway guards 3130 to flex somewhat to gain access for removal of one or both of the breakaways 2116 (FIG. 16F), as described with respect to FIGS. 16G-H, above. Mounting apertures 3140 are defined in the mounting ears 3110, wire apertures 3150 are defined in the shield wings 3120, and a bracket aperture 3160 is defined in a central portion of the spine 3105.

As shown in FIGS. 31A-B, the terminal shield 3100 is installed with the back side 3102 proximate the wiring module 1600 (FIG. 30A) and the front side 3101 distal the wiring module 1600 (FIG. 30A). In particular, the spine 3105 fits against the bracket 1900 and the bracket aperture 3160 accommodates protrusions due to the ground clip 1902 (FIG. 17A) or its associated fastener. The mounting apertures 3140 accept the fasteners 1909 (FIG. 30A), which also secure together the wiring module 1600 (FIG. 30A). The shield wings 3120 cover exposed portions of the terminal set 2100

(FIG. 17A), and the wire apertures 3150 accommodate wire ends that are connected to the terminal set 2100 (FIG. 17A).

Other Functional Modules

Although described above with respect to outlet and switch modules, the electrical distribution system may operate in conjunction with a variety of functional modules providing various electrical functions, such as security modules, data transfer modules, computing modules, home entertainment modules and intelligent home product modules to name a few. For example, a security module may incorporate a video camera or motion sensor. A data transfer module may incorporate data storage devices, wireless transceivers or AC power line transceivers. A computing module may incorporate a microprocessor, a data entry or display device, for example. A home entertainment module may work in conjunction with speakers, LCD panels or plasma TVs. A home product module, for instance, may incorporate a microcontroller and a wireless or an AC power line transceiver for appliance control.

A safety module electrical distribution system has been disclosed in detail in connection with various embodiments. These embodiments are disclosed by way of examples only and are not to limit the scope of the claims that follow. One of ordinary skill in the art will appreciate many variations and modifications.

What is claimed is:

1. A method of manufacturing a wiring module adapted to fit within an electrical box, the wiring module adapted to connect to a functional module, the method comprising:

terminating at least four electrical wires to corresponding terminals in a terminal set;

placing said terminals within a non-conductive wiring piece or a non-conductive functional piece; and connecting said non-conductive functional piece to said non-conductive wiring piece, leaving a plurality of the terminals exposed via a plurality of openings in said functional piece, and with said at least four wires extending from said wiring module, wherein said wiring module comprises said non-conductive functional piece and said non-conductive wiring piece and is configured to fit within said electrical box.

2. The method of claim 1, further comprising the step of attaching at least one functional module to the wiring module.

3. The method of claim 2, wherein the functional module comprises a three way switch.

4. The method of claim 2, wherein the functional module comprises a four way switch.

5. The method of claim 2, wherein the functional module comprises a dimmer.

6. The method of claim 1, further comprising the step of affixing a protective cover over the wiring module, said cover preventing installation of a functional module.

7. The method of claim 1, further comprising the step of affixing an electrical box to at least one of the fixed wires.

8. The method of claim 1, further comprising the step of affixing a label to the wiring module, said label being for marking wiring or location information.

9. The method of claim 1, wherein one or more of said fixed wires has an end adapted to attach a wire connector.

\* \* \* \* \*